US011782992B2

(12) United States Patent
Majumdar et al.

(10) Patent No.: US 11,782,992 B2
(45) Date of Patent: *Oct. 10, 2023

(54) METHOD AND APPARATUS OF MACHINE LEARNING USING A NETWORK WITH SOFTWARE AGENTS AT THE NETWORK NODES AND THEN RANKING NETWORK NODES

(71) Applicant: KYNDI, INC., San Mateo, CA (US)

(72) Inventors: Arun Majumdar, San Mateo, CA (US); James Ryan Welsh, San Mateo, CA (US)

(73) Assignee: KYNDI, INC., San Mateo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/486,523

(22) PCT Filed: Feb. 20, 2018

(86) PCT No.: PCT/US2018/018833
§ 371 (c)(1),
(2) Date: Aug. 16, 2019

(87) PCT Pub. No.: WO2018/152534
PCT Pub. Date: Aug. 23, 2018

(65) Prior Publication Data
US 2020/0004752 A1    Jan. 2, 2020

Related U.S. Application Data

(60) Provisional application No. 62/460,570, filed on Feb. 17, 2017.

(51) Int. Cl.
G06F 16/9535    (2019.01)
G06F 16/28    (2019.01)
(Continued)

(52) U.S. Cl.
CPC .... *G06F 16/9535* (2019.01); *G06F 16/24578* (2019.01); *G06F 16/28* (2019.01);
(Continued)

(58) Field of Classification Search
CPC ........ G06F 17/00; G06F 16/00; G06F 16/951; G06F 17/2235
See application file for complete search history.

(56) References Cited

U.S. PATENT DOCUMENTS 6,681,247 B1 *   1/2004   Payton ................. G06F 16/284
                                                     709/217
7,877,385 B2     1/2011   Craswell et al.
(Continued)

FOREIGN PATENT DOCUMENTS

JP    2009-140173 A    6/2009
JP    2013-536484 A    9/2013
(Continued)

OTHER PUBLICATIONS

Wheeler, Nicholas, Some Uncommon Matrix Theory, Apr. 2012, Reed College Physics Department (Year: 2012).*
(Continued)

*Primary Examiner* — Sherief Badawi
*Assistant Examiner* — William P Bartlett
(74) *Attorney, Agent, or Firm* — Oblon, McClelland, Maier & Neustadt, L.L.P.

(57) ABSTRACT

An apparatus and method are provided for rapidly ranking network nodes according to input ranking criteria. The links (i.e., first-order paths) between nodes are expressed in a first-order path matrix, which is used to generate nth-order path matrices as nth powers of the first-order path matrix and summed as a power series to generate a surrogate ranking operator (SRO) representing as a single matrix operation a sum over paths of all orders. Thus, in contrast to conven-
(Continued)

tional ranking methods that require multiple recursive steps to account for the interrelatedness of linked nodes, a ranking is produced by multiplying the SRO by a state vector representing the input ranking criteria.

16 Claims, 10 Drawing Sheets

(51) Int. Cl.
    *G06F 16/901* (2019.01)
    *G06F 17/16* (2006.01)
    *H04L 41/046* (2022.01)
    *G06N 5/043* (2023.01)
    *G06N 20/00* (2019.01)
    *G06N 3/006* (2023.01)
    *H04L 41/16* (2022.01)
    *G06N 20/20* (2019.01)
    *H04L 41/147* (2022.01)
    *G06N 10/00* (2022.01)
    *G06F 16/2457* (2019.01)
    *H04L 67/02* (2022.01)

(52) U.S. Cl.
    CPC .......... *G06F 16/9024* (2019.01); *G06F 17/16* (2013.01); *G06N 3/006* (2013.01); *G06N 5/043* (2013.01); *G06N 10/00* (2019.01); *G06N 20/00* (2019.01); *G06N 20/20* (2019.01); *H04L 41/046* (2013.01); *H04L 41/147* (2013.01); *H04L 41/16* (2013.01); *H04L 67/02* (2013.01)

(56) References Cited

U.S. PATENT DOCUMENTS

| | | | |
|---|---|---|---|
| 8,755,837 | B2 | 6/2014 | Rhoads et al. |
| 9,165,040 | B1 | 10/2015 | Hajaj |
| 9,818,136 | B1 | 11/2017 | Hoffberg |
| 2005/0259585 | A1* | 11/2005 | Sauermann ............. G06F 17/16 370/241 |
| 2008/0270390 | A1* | 10/2008 | Ward .................... G06F 16/951 |
| 2013/0198372 | A1* | 8/2013 | Wei ........................ H04L 43/10 709/224 |
| 2014/0032580 | A1 | 1/2014 | Majumdar |
| 2015/0169758 | A1 | 6/2015 | Assom et al. |
| 2015/0356144 | A1 | 12/2015 | Chawla et al. |

FOREIGN PATENT DOCUMENTS

| | | |
|---|---|---|
| JP | 2014-115839 A | 6/2014 |
| WO | WO 2016/154460 A1 | 9/2016 |

OTHER PUBLICATIONS

Broida, Joel G., and Stanley Gill Williamson. A comprehensive introduction to linear algebra. vol. 4. Redwood City, CA: Addison-Wesley, 1989. (Year: 1989).*
Sánchez-Burillo, Eduardo, et al. "Quantum navigation and ranking in complex networks." Scientific reports 2.1 (2012): 1-8. (Year: 2012).*
International Search Report and Written Opinion dated May 14, 2018 in PCT/US2018/018833 filed Feb. 20, 2018.
Office Action dated Apr. 30. 2021 in corresponding Indian Patent Application No. 201917032365 (with English Translation), 7 pages.
Extended European Search Report dated Dec. 1, 2020 in European Patent Application No. 18753710.5, 8 pages.
Office Action dated Oct. 8, 2021, in corresponding Japanese Patent Application No. 2019-543224 with English translation, 8 pages.
Examination Report dated Nov. 11, 2021, in corresponding Australia Patent Application No. 2018220752, 4 pages.
Office Action dated Oct. 4, 2022, in corresponding Korean Patent Application No. 2019-7024199, 9 pages.
Barbarossa et al., On Sparse Controllability of Graph Signals, 2016 IEEE International Conference on Acoustics, Speech and Signal Processing, pp. 4104-4108 (2016).

\* cited by examiner

METHOD AND APPARATUS OF MACHINE LEARNING USING A NETWORK WITH SOFTWARE AGENTS AT THE NETWORK NODES AND THEN RANKING NETWORK NODES

CROSS REFERENCE TO RELATED PAPERS

This application is based upon and claims the benefit of priority to provisional U.S. Application No. 62/460,570, filed Feb. 17, 2017, the entire contents of which are incorporated herein by reference.

FIELD

The illustrative embodiments described herein relate to rapidly applying network information when ranking network nodes according to received ranking criteria, and, more particularly, to ranking node of a network by multiplying a state vector representing the ranking criteria by a matrix that is a surrogate ranking operator. Further, the illustrative embodiments described herein relate to learning patterns in interactive networks and rapidly applying the learned patterns to answer inquires, and, more particularly, to ranking node of a network by multiplying a state vector representing the ranking criteria by a matrix that is a surrogate ranking operator

BACKGROUND

Many technical problems in the computer-related arts essentially reduce to the problem of applying the information provided in an interconnected network of nodes to ranks the nodes according to a particular set of criteria and/or user inputs.

For example, Netflix.com™ can be viewed as a network of digital media content (i.e., movies), and, based on a user's ratings of previously watched and a record of which movies have been watched, recommendations can be provided about which movies the user would likely prefer to watch in the future. This recommendation might be based a network of connections between movies representing their similarities or based Bayesian inferences from correlations and statistical information of the ratings and watching tendencies of other users that have been accumulated over time. Thus, a recommender system like the movie recommendations provided by Netflix.com™ or other online media content providers can be understood as essentially using a particular set of criteria and/or user inputs to provide a ranking of nodes based on the interconnection between the nodes.

Similarly, the World Wide Web can clearly be understood as a network of interconnected nodes (i.e., internet pages/sites interconnected by hyperlinks, related content, etc.). Further, search engines and algorithms, such as Google's™ PageRank algorithm, can be understood as using user inputs (e.g., key words entered as text into a search input) and ranking the nodes of this network according to their both their relative importance (e.g., based on interconnections between the nodes within the network) and also the connections of search criteria (e.g., key words in a text search) to the content of the network nodes.

As technology advances, this pattern of solving the technical problem of ranking data based on an interconnected network is repeated in various contexts from medicine (e.g., using a network of related medical records connected, for example, by similarities in symptoms, treatments, and outcomes, to rank cases similar to a current medical history or to rank procedures likely to achieve a favorable outcome) to social networks to consumer advertising to security and consumer fraud threats to traffic/GPS navigation systems, etc. Accordingly, this technical problem is a significant, recurring problem rooted in computer-related technologies. In view of its significance, this technical problem has been addressed using various approaches, and, in general, one solution to the underlying technical problem of ordering network elements based on (i) a given set of search criteria and (ii) the structure/interconnections of the network is fundamentally and universally applicable among all similarly posed applications of ranking based on networks. For example, it has been proposed that PageRank algorithm can be applied in biochemistry to provide a measure of the relative importance and identify promising drug targets in proteins. Because ranking network/graph nodes is such a common and recurring technical problem improved and faster methods are desired for generating rankings from network information.

For example, a conventional link analysis algorithm, such as the PageRank algorithm, can assign a numerical weighting to each element of a hyperlinked set of documents, such as the World Wide Web, with the purpose of measuring its relative importance within the set. In general the algorithm may be applied to any collection of nodes having content forming the basis of connection, including, e.g., reciprocal quotations and references. A numerical weight is assigned to any given node based on these connections. Further, ranks can be influenced by more than one level of networks corresponding to attributes embedded in the metadata as well as the communicated content (e.g., the author can be ranked according to a network of authors and their interconnections and scholars can be ranked according to a network of interconnections and citations).

For example, in the PageRank algorithm the numerical weight assigned to an element E referred to as the PageRank of E, as described in S. Brim and L. Page, "*The anatomy of a large-scale hypertextual Web search engine*," Computer Networks and ISDN Systems. 30: 107-117 (1998), incorporated herein by reference in its entirety. In particular, a PageRank results from a mathematical algorithm based on the webgraph, created by all World Wide Web pages as nodes and hyperlinks as edges, taking into consideration authority hubs. The rank value indicates an importance of a particular page. A hyperlink to a page counts as a vote of support. The PageRank of a page is defined recursively and depends on the number and PageRank metric of all pages that link to it (i.e., incoming links). Thus, a page that is linked to by many pages with high PageRank receives a high rank itself. The drawback to such a recursive walk through the network is the time and computational resources that it requires. Thus, faster ranking methods are desired for networks, which can also be referred to, more generally, as graphs, which is a more rigorous mathematical term for the data structures that are colloquially referred to as networks.

Moreover, in many cases network/graph representations are not known a priori, and must instead be learned from empirical measurements and data. Various conventional methods are known, such as artificial neural networks (ANNs) and other, to learn patterns based on training data. However, these conventional methods have various drawbacks. Accordingly, better methods of network and pattern learning are desired, which will apply faster, more robust approaches to efficiently learn and model networks and patterns.

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Machine learning and artificial intelligence (AI) technologies have been applied to many different problems and technologies, but conventional approaches have several drawbacks limiting their impact. Whereas the great strength of AI technology is its coverage of nearly every aspect of intelligence, its great weakness is fragmentation. Most AI systems are designed and built from one paradigm. For example, the most well-known AI paradigm today is Deep Learning, a subset of machine learning, which itself is a subset of AI. In the Deep Learning paradigm, multi-layer artificial neural networks ("ANNs") are the most commonly used method, and backpropagation is the most common ANN learning method. Backpropagation incorporates gradient descent over an error surface in a space defined by the weight matrix. That is, it calculates the gradient of a loss function. Thus, Deep Learning is not straightforwardly amenable to being combined with other AI paradigms, such as logic. The same can also be said of other machine learning methods. That is, they are fragmented such that combining them requires specialized considerations, which are often not robust.

Further, although machine learning methods are good at nuanced classification and prediction, they lack contextual capability and minimal reasoning ability. Conversely, symbolic methods are good at reasoning over defined problems, but have no learning capability and poor handling of uncertainty. If these approaches could be combined, the strengths of one paradigm might compensate for the deficiencies of the other, and vice versa. However, any system that endeavors to combine multiple paradigms requires a great deal of specialized labor to tailor the components, make them work together, and test the many combinations on desired outputs. Even then the result might not be robust to changes.

Unfortunately, conventional methods fail to provide a robust solution to the above challenges.

BRIEF DESCRIPTION OF THE DRAWINGS

A more complete appreciation of the disclosed inventions and the many attendant advantages thereof will be readily obtained as the same becomes better understood by reference to the following detailed description when considered in connection with the accompanying drawings, wherein.

DETAILED DESCRIPTION

The methods and apparatus described herein overcome the above-discussed deficiencies in conventional methods that rank nodes of a network (also referred to as a graph) using multiple recursive steps to traverse the network nodes. In contrast to conventional methods, the methods described herein draw from insights and analogies to quantum mechanics and quantum field theory in order to generate a surrogate rank operator (SRO) that ranks results from the network in a single operational step. Similar to Richard Feynman's calculus of variations approach to quantum field theory, in which the propagation operator is treated as a summation/integral over all possible states, the SRO is a matrix that can represent in a single operator a summation over all paths in a graph/network, thereby outputting a ranking of the graph/network nodes based on a matrix multiplication between the SRO and a vector representing an input query (e.g., search criteria).

For example, in certain implementations of the methods described herein, the SRO is formulated as a closed-form solution approximating the n-step recursive walk in which an internal walk history (in contrast to true Markovian property) is emulated by a single application to an input concept vector. Here, a network of concepts is being used as a non-limiting example, and the concepts embedded at the nodes are analogized to a points in a discrete space through which a particle/probability wave-function in quantum mechanics (i.e., input concept or search criteria) passes through on its way to evolving to the output (i.e., final quantum state or ranking of concepts). In other words, instead of computing the n-recursive steps of computation of a particle as it moves from one node to the next, taking into account the contribution of the prior vertices (like the typical Bayesian Network) this operator yields a "jump" that evolves the particle (i.e. input concept) directly to the ranking result in a single iteration step.

In certain implementations, this evolution is represented by exponentiating a first-order path matrix to generate the SRO, the first-order path matrix is subject to normalization and bistochasticity conditions.

In certain implementations, the SRO also is path adjusted to remove path redundancies.

First, a description is provided regarding how the SRO is generated from the first-order path matrix. Then a description is provided regarding how the SRO compares to and is many ways analogous to an evolution operator in the Heisenberg-picture of quantum mechanics in a potential-free space (or partition function in a quantum field theory).

Figure 1:
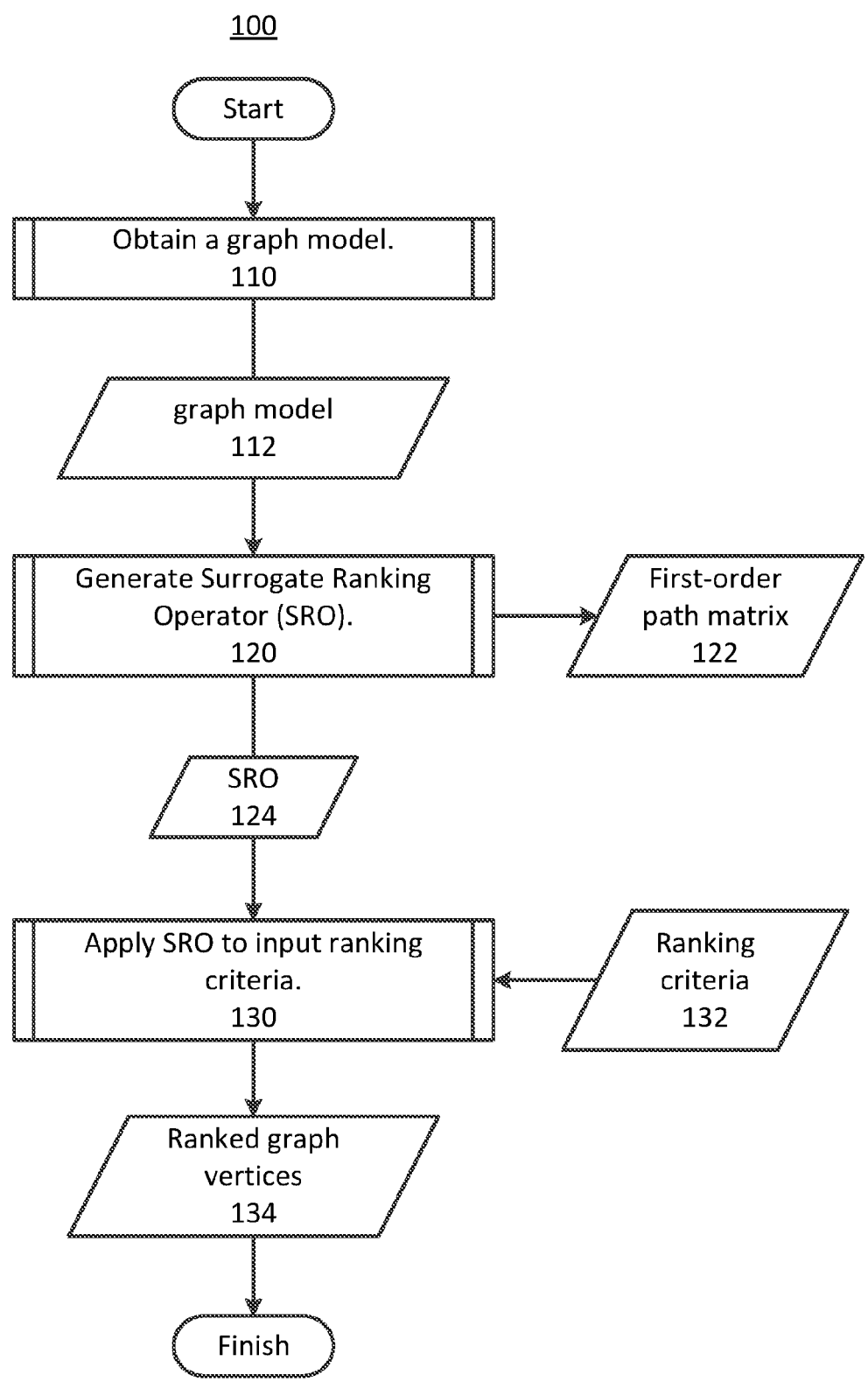
FIG. 1 shows an example of a flow diagram of a method of ranking a network based on input ranking criteria, according to one implementation.

Referring now to the drawings, wherein like reference numerals designate identical or corresponding parts throughout the several views, FIG. 1 shows a flow diagram of method 100 of generating and using a graph model to perform inquiries on the graph information and rapidly generate outputs.

In process 110 of method 100, the graph model 112 is generated. In some cases, the graph model 112 already exists, such as in the case in internet websites and their links. In this case, graph model 112 is simply read from its source or a location in computer readable memory that has been previously stored. In other cases, the model is learned from training data, e.g., using a machine learning method.

Figure 2:
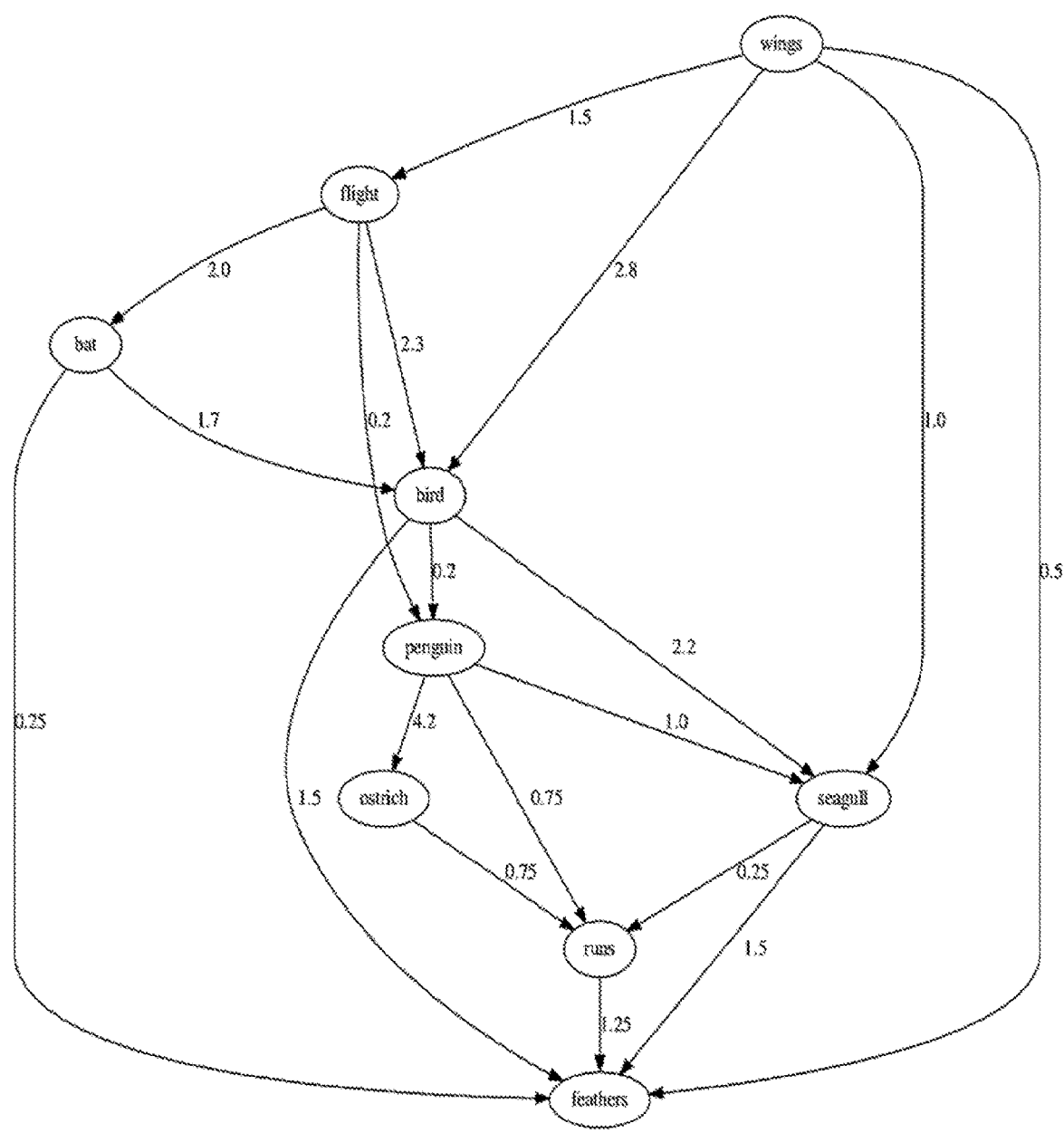
FIG. 2 shows an example of the network of concepts connected by weighted edges/links, according to one implementation.

In process 120 of method 100, the SRO is generated from a first-order path matrix 122 of the graph model 112. The first-order path matrix 122 can take on different representations. For example, as discussed below, the connections between vertices can be represented as positive numbers, real numbers, complex numbers, or bi-convex numbers, depending on whether the edges between vertices in the graph are weighted, directional, etc. Here, the non-limiting example of weighted edges connecting the vertices is used to exemplify the first-order path matrix. The first-order path matrix represents the connections between vertices in the graph. For example, FIG. 2 shows an example of a network of words (i.e., concepts) and the strength of the connections between nodes/vertices of the network/graph represented as weighted edges. The network shown in FIG. 2 is a typical network found in classical artificial intelegence (AI) texts that represents the relationships between various nodes. In general, any networks can be represented by matrices in which each row (column) represents a respective node/vertex. When the edges are not weighted, some variation of a non-weighted adjacency matrix can be used, as would be understood by a person of ordinary skill in the art and as described in U.S. Pat. No. 9,158,847, incorporated herein by reference in its entirety. For the network shown in FIG. 2, which has weighted edges between the vertices, the network can be represented by a matrix is called the first-order path matrix (T) shown in Table 1, in which the concept vector is given by

```
CONCEPTS = [
              'bat',
              'bird',
              'feathers',
              'flight',
              'penguin',
              'ostrich',
              'runs',
              'seagull',
              'wings'
            ],
``` and the definition of the weighted links between the vertices of the concepts is given by

```
LINKS = [
          ('flight', 2.3, 'bird'),
          ('flight', 2.0, 'bat'),
          ('flight', 0.2, 'penguin'),
          ('wings', 2.8, 'bird'),
          ('wings', 1.0, 'seagull'),
          ('wings', 0.5, 'feathers'),
          ('wings', 1.5, 'flight'),
          ('bat', 0.25, 'feathers'),
          ('bat', 1.7, 'bird'),
          ('bird', 0.2, 'penguin'),
          ('bird', 2.2, 'seagull'),
          ('bird', 1.5, 'feathers'),
          ('penguin', 4.2, 'ostrich'),
          ('penguin', 1.0, 'seagull'),
          ('penguin', 0.75, 'runs'),
          ('ostrich', 0.75, 'runs'),
          ('seagull', 0.25, 'runs'),
          ('seagull', 1.5, 'feathers'),
          ('runs', 1.25, 'feathers'),
        ].
```

A flow chart of one implementation of the process to generate the SRO from the first-order path matrix is shown FIG. 3, which is described below.

TABLE 1

The first-order path matrix (T) of the network shown in FIG. 1.

| [[ 1.   | 1.7 | 0.25 | 2.  | 0.   | 0.   | 0.   | 0.   | 0.  ] |
|---------|-----|------|-----|------|------|------|------|-------|
| [ 1.7   | 1.  | 1.5  | 2.3 | 0.   | 0.2  | 0.   | 2.2  | 2.8 ] |
| [ 0.25  | 1.5 | 1.   | 0.  | 0.   | 0.   | 1.25 | 1.5  | 0.5 ] |
| [ 2.    | 2.3 | 0.   | 1.  | 0.   | 0.2  | 0.   | 0.   | 1.5 ] |
| [ 0.    | 0.  | 0.   | 0.  | 1.   | 4.2  | 0.75 | 0.   | 0.  ] |
| [ 0.    | 0.2 | 0.   | 0.2 | 4.2  | 1.   | 0.75 | 1.   | 0.  ] |
| [ 0.    | 0.  | 1.25 | 0.  | 0.75 | 0.75 | 1.   | 0.25 | 0.  ] |
| [ 0.    | 2.2 | 1.5  | 0.  | 0.   | 1.   | 0.25 | 1.   | 1.  ] |
| [ 0.    | 2.8 | 0.5  | 1.5 | 0.   | 0.   | 0.   | 1.   | 1. ]] |

In process 130 of method 100, the SRO is applied to an input vector representing an inquiry regarding the information in the network model, and an output vector is generated representing the answer to the inquiry, as a ranking of the content of the vertices in the graph. We note that "vertex" and "node" can be used interchangeable, as can "network" and "graph" for the following discussion. Accordingly, we will adopt the notation of using only the terms "vertex" and "graph" hereafter.

Returning to the example in FIG. 2 of a graph model 112, in one exemplary implementation of method 100, an inquiry to rank the concepts in the graph according to the ranking criteria of <bird, flight> (i.e., this concept criteria is expressed by the concept vector [0, 1, 0, 1, 0, 0, 0, 0]) returns the following result, when the concept vector for the ranking criteria is multiplied by the SRO:

```
RANKING = [
            ('bird', 0.10682496574236461),
            ('flight', 0.07405044308261416),
            ('wings', 0.06795166019737214),
            ('seagull', 0.05237253912237341),
            ('bat', 0.050509732912895844),
            ('feathers', 0.040901599425686726),
```

-continued

```
              ('penguin', 0.013721569470986938),
              ('runs', 0.009300038104282584),
              ('ostrich', 0.006327943268444871)
].
```

The number to the right of the concept represents a measure of matching to the ranking criteria. Unsurprisingly, the concepts of 'bird' and 'flight' are highly ranked, as are concepts which are strongly connected to 'bird' and 'flight' like 'wing' and "seagull'. Similarly, a ranking inquiry based on ranking criteria of <penguin> returns a ranking of

```
RANKING = [
              ('penguin', 0.05111524080300288),
              ('ostrich', 0.029911422806821922),
              ('runs', 0.014030105982093257),
              ('seagull', 0.009914599034979397),
              ('bird', 0.009838069472489839),
              ('feathers', 0.008170846911161714),
              ('wings', 0.006046069210972645),
              ('flight', 0.0038834999984971),
              ('bat', 0.0027102214155942748)
].
```

Further, a ranking inquiry based on ranking criteria of <bird> returns a ranking of

```
RANKING = [
              ('penguin', 0.05111524080300288),
              ('ostrich', 0.029911422806821922),
              ('runs', 0.014030105982093257),
              ('seagull', 0.009914599034979397),
              ('bird', 0.009838069472489839),
              ('feathers', 0.008170846911161714),
              ('wings', 0.006046069210972645),
              ('flight', 0.0038834999984971),
              ('bat', 0.0027102214155942748)
].
```

Figure 3:
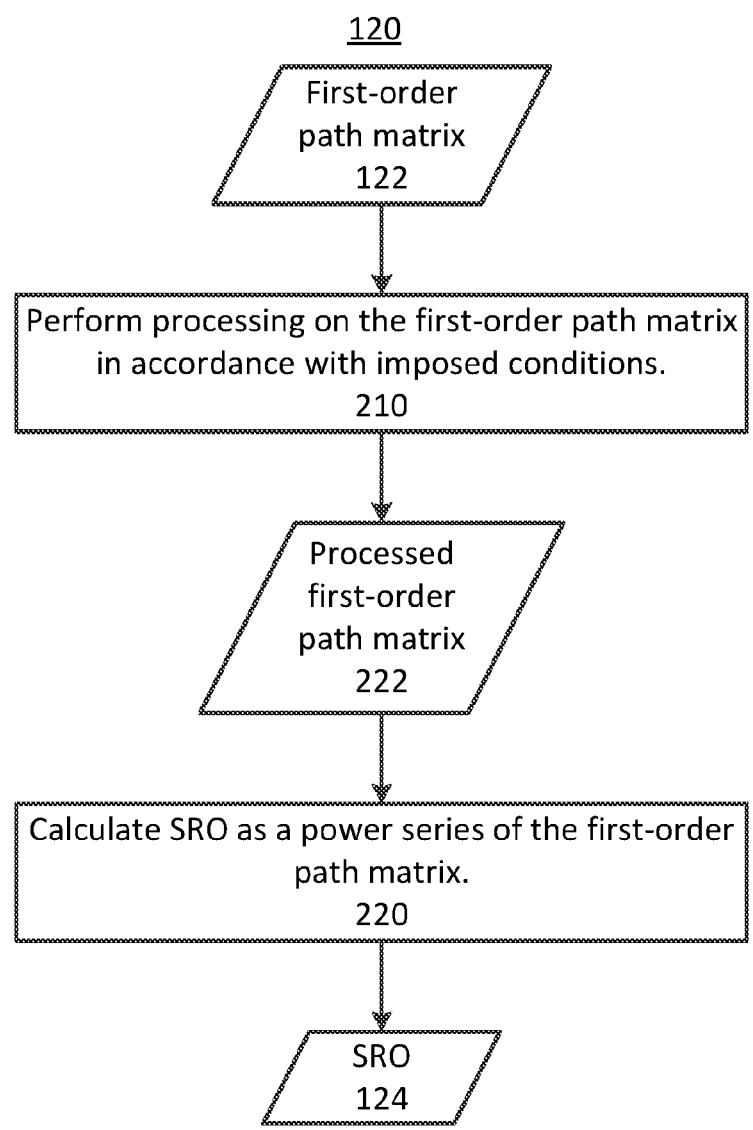
FIG. 3 shows an example of a flow diagram of a process to generate a surrogate ranking operator (SRO), according to one implementation.
Figure 4:
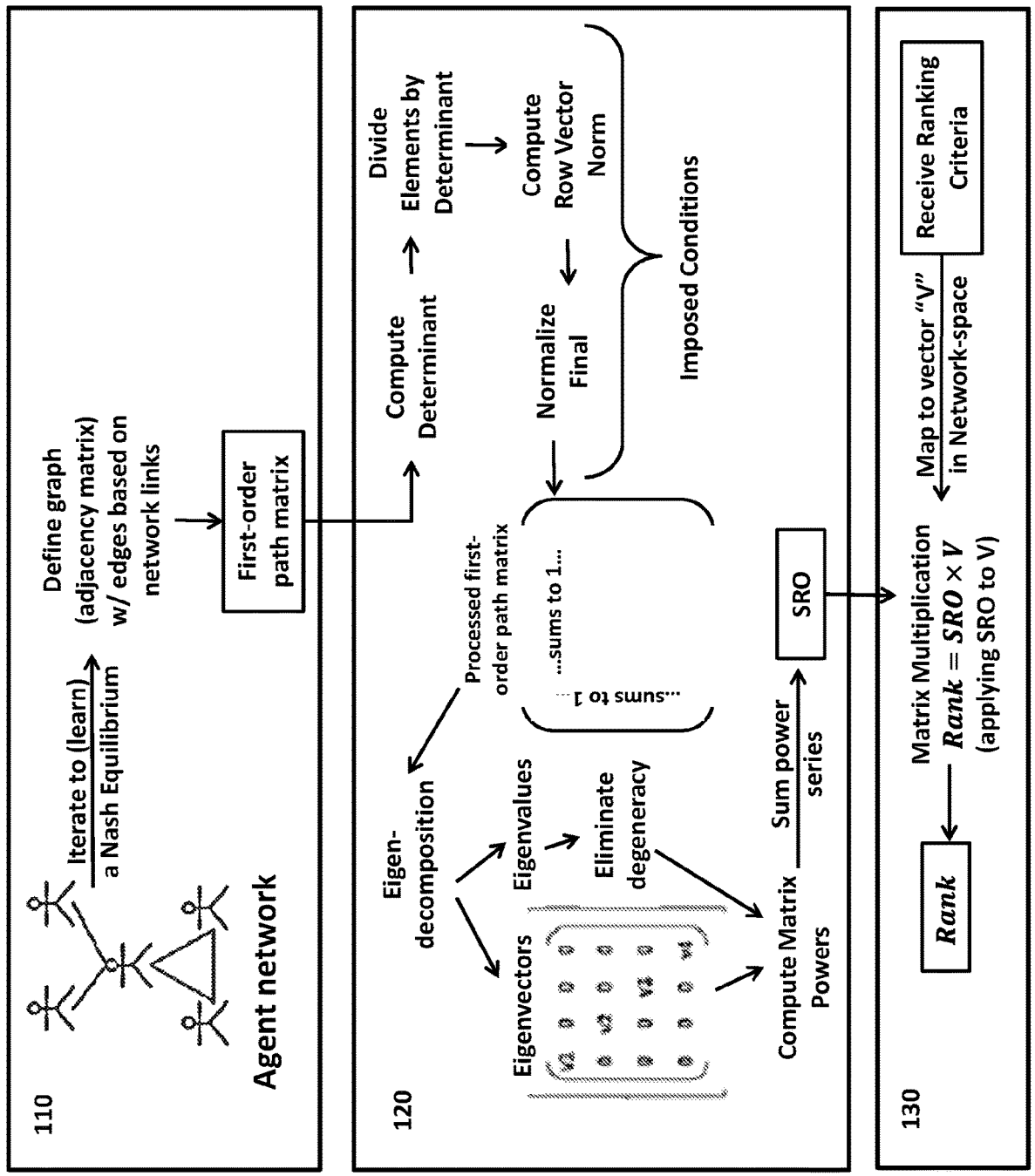
FIG. 4 shows an example of schematic diagram of the method of ranking the network nodes based on the input ranking criteria, according to one implementation.

FIG. 3 shows a flow diagram of one implementation of process 120, and FIG. 4 shows a schematic diagram of an implementation of method 100.

In step 210 of process 120, the first-order path matrix is processed such that it satisfies certain imposed conditions. In certain implementations, conditions of bistochasticity and matrix normalization can be imposed. The normalization condition can be imposed by dividing each element of the matrix by the determinant of the matrix. Additionally, bistochasticity can be imposed, ensuring that each row sums to unity and each column sums to unity. Further, a no-degeneracy condition can be imposed by making changes to ensure that each eigenvalues is unique (e.g., degeneracy occurs in quantum systems when two quantum states have the same energy). Another condition that can be imposed is that the dimensions of the matrix to equal its rank/cardinality (e.g., no zero eigenvalues, or the null-space of the first-order path matrix is empty). In certain implementations, a null-space of matrix can be defined as a kernel of the matrix. In certain implementations, a graph Laplacian can be used to generate the first-order path matrix. Further, the processing of the first-order path matrix can include ordering the vertices (e.g., changing which indices of the matrix correspond to which concepts/content of the graph/network). The result of step 210 is a processed first-order path matrix T.

In step 220 of process 120, powers of the processed first-order path matrix T are calculated and used to calculate a Surrogate Ranking Operator (SRO). For example, the $n^{th}$ power of T is represented as $T^n$. The second power matrix $T^2$ represents the connections with two edges between concepts. For example, in FIG. 2, 'bat' is connected to 'flight' by paths of two edges through 'flight' (link weights of 2.0 and 1.5), 'bird' (link weights of 1.7 and 2.8), and 'feathers' (link weights of 0.25 and 0.5). In certain implementations, the SRO is generated using the expression $$SRO = e^T + 1.$$

In practice this can be calculated using the Taylor series expansion $e^T = \Sum_i T^i/i!$. Further, an Eigen-decomposition can be performed on the processed matrix T such that $$T = Q\Lambda Q^{-1},$$

wherein $\Lambda$ is a diagonal matrix of the eigenvalues of the matrix T, Q is unitary matrix in which the $n^{th}$ column vector is the eigenvector corresponding to the $n^{th}$ eigenvalue $\lambda_n = \Lambda_{n,n}$, and $Q^{-1}$ is the inverse of Q (i.e., the $n^{th}$ row vector is the complex conjugates of the $n^{th}$ column vector of Q). Accordingly, the $i^{th}$ power matrix simplifies to $T^i = Q\Lambda^i Q^{-1}$, and $\Lambda^i$ simplifies to a diagonal of the $i^{th}$ power of the respective eigenvalues.

In certain implementations, the SRO is calculated as the expression $$SRO = e^T + 1$$

for networks/graphs in which the nodes/vertices are unordered. Also, this expression can be used to calculate the SRO when the network/graph has an arbitrary permutations.

In certain implementations, the SRO is calculated as the expression $$SRO = 1 + \Sum_i \overline{T}^i / 2^i e^T$$

for networks/graphs in which the nodes/vertices are ordered. Also, this expression can be used to calculate the SRO when the network/graph is a binary system.

Note the matrix normalization discussed above includes the steps of computing a determinant of the matrix, and dividing each element of the matrix by the computed determinant. Further, matrix normalization can include computing a vector norm for each row of the matrix. Moreover, imposing a bio-stochasticity condition can include a verification process performed to verify that the normalized vector satisfies the condition of bio-stochasticity. Specifically it is ensured that the sum of elements of each row, and each column total to one. These processes would be understood by a person of ordinary skill in the art, and variations can be implemented without departing from the spirit of the invention, as would be understood by a person of ordinary skill in the art.

For example, in certain implementations, process 120 can include using feedback provided by the eigen-decomposition to detect degeneracy (e.g., when one or more eigenvalues is essentially zero relative to the other eigenvalues), and the changing data elements to eliminate or lift the degeneracy.

Further, in certain implementations, process 120 can include steps to return a path-adjusted SRO. For example, the redundant path erasure function can be applied as follows:

1) A datum that is a neighbor of itself is a path between two identical data elements in the same position in the network. Accordingly set the diagonal values to 1.0 to erase a self-path in which a datum is a neighbor of itself
2) All non-zero values of T are set to 1, and the diagonal values are set to 1.0 to yield a first-order-path matrix T1.

3) Square the matrix T1 (raising to a second power) to obtain the second-order path matrix T2.
4) At this point, there can exist some redundant paths such as: a-c-a.
5) To remove the redundancies, path erasure at second power of the matrix can be achieved by setting the diagonal to 1.0. This ensures that in a path a-b-c that 'a' does not equal 'c' so that paths like a-c-a are not counted in twice.
6) Cube the matrix T1 to obtain the third-order path matrix T3.
   Similarly to the second power case, there can be redundant paths. Let the third order path between data elements (a) and (b) be via (c) and (d). Therefore, three first-order paths in the third-order path matrix could be: a and c; c and d; d and b. First we ensure that c and d are not the same as either a or b. Note: By setting the diagonal elements to 1.0 to ensure first order path erasure, it ensures that a c and that d b. Path erasure at third order matrix powers follows a similar process: for paths such as a-b-c-d we wish to erase a-b-c-b and a-b-a-c patterns in order to ensure uniqueness. In order to do this, we use the zeroth-order path matrix, which is the original matrix T0 (e.g., the adjacency matrix). For each row of T0 we compute the sum of the elements to produce a column vector, C, of row costs (this is equivalent to the row vector of column sums of elements also since the path is bidirectional).

$$T = \begin{bmatrix} 0 & 1 & 1 & 1 \\ 1 & 0 & 0 & 1 \\ 1 & 0 & 0 & 1 \\ 1 & 1 & 1 & 0 \end{bmatrix} \xrightarrow{\Sigma rows} \begin{bmatrix} 3 \\ 2 \\ 2 \\ 3 \end{bmatrix}$$

7) The path redundancy matrix (of equivalent paths) is written as a path discount matrix to be subtracted from the third-order path matrix. The path discount matrix is computed for each of its elements, i,j, using the formula:

$$D_{i,j} = C_i + C_j - 1; \text{ for } i \neq j$$

$$D_{i,j} = 0; \text{ for } i = j$$

wherein, elements of the column vector are: $C_1=3$; $C_2=2$; $C_3=2$; $C_4=3$. Hence, (showing the calculation for the first row only):

$$D_{1,1}=0$$

$$D_{1,2}=C_1+C_2-1=3+2-1=4$$

$$D_{1,3}=C_1+C_3-1=3+2-1=4$$

$$D_{1,4}=C_1+C_4-1=3+3-1=5$$

The full matrix is computed:

$$D = \begin{bmatrix} 0 & 4 & 4 & 5 \\ 4 & 0 & 3 & 4 \\ 4 & 3 & 0 & 4 \\ 5 & 4 & 4 & 0 \end{bmatrix}$$

8) In order to correct the third-order path matrix by erasing the redundant paths, we transform T 3 as follows:

$$T3 = T3 - D*T,$$

wherein the symbol '*' is the scalar element by element product of $D_{i,j}*T_{i',j'}$ for each i=i' and j=j'.

Then the SRO is calculated using the powers of the matrix T as described above.

In step 310 of process 130, an input vector is created in which zeros are filled into each data element of the vector. Next, if a data-element in the ranking criteria has a property from the original matrix T, then set the value from 0 to 1 for the element of the vector at the corresponding index. Alternatively, for elements in the ranking criteria not original used in the graph/network, a measure of similarity to elements in the graph/network can be used to map the element onto one or more indices in the input vector. For example, the measure can be a Jaccard measure or other measure system. Consider a search criteria including the concept <eagle>, then a semantic distance measure, such as the Positive pointwise mutual information (PMMI) discussed in P. D. Turney and P. Pantel, "*From Frequency to Meaning: Vector Space Models of Semantics,*" Journal of Artificial Intelligence Research 37, 141-181 (2010), incorporated herein by reference in its entirety, and as discussed in D. Jurafsky and J. H. Martin "Speech and Language Processing" Prentice Hall Series in Artificial Intelligence (2008), incorporated herein by reference in its entirety. The measure used to characterize proximity in semantic meaning might also be any of the measures discussed in U.S. Pat. No. 8,566,321, incorporated herein by reference. For example, the concept <eagle> might map primarily onto the concepts <bird> and to a lesser degree on the concepts of <feather> and <flight>.

Next, in step 320 of process 130, the SRO is applied using the dot product to multiple the input vector by the SRO. The result is an output vector providing values at each index for the corresponding element/vertex in the graph. The ranked list is generated by arranging the elements (e.g., concepts) of the graph according to the numerical order of the corresponding values of the output vector, as illustrated above for the ranking queries using criteria of <bird, flight> and <penguin>.

Figure 5:
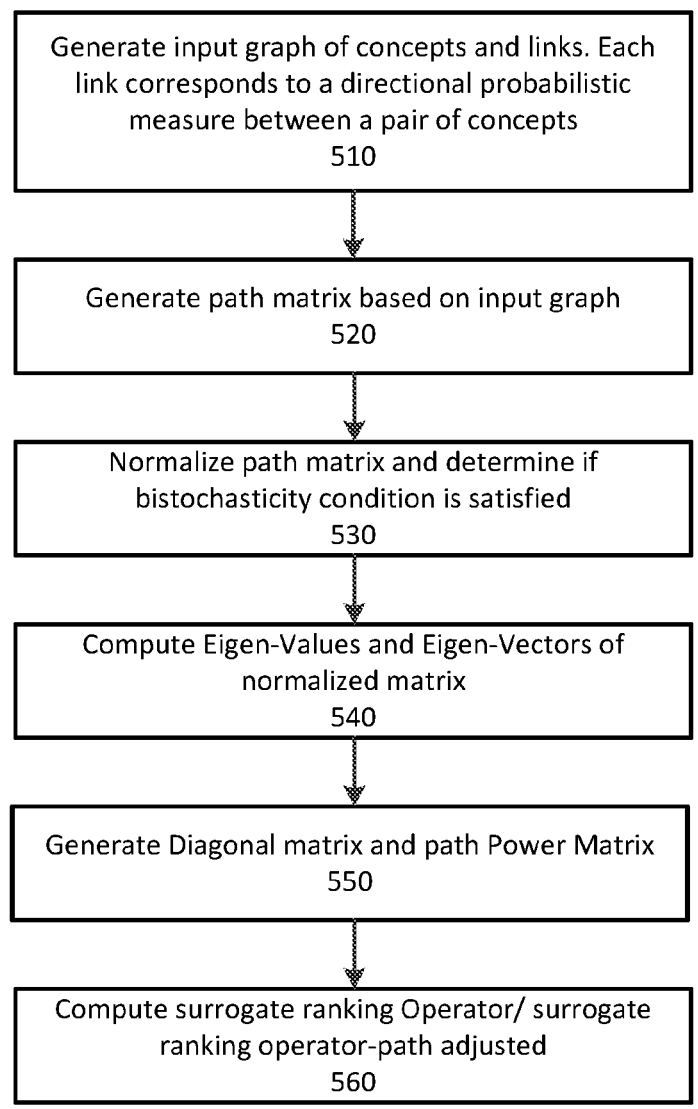
FIG. 5 shows another example of a flow diagram of the method of ranking the network nodes based on the input ranking criteria, according to one implementation.

FIG. 5 shows another flow diagram of method 100 according to another implementation.

In step 510, an input graph of concepts and links is generated. In certain implementations, each link of the graph corresponds to a directional probabilistic measure between a pair of concepts.

In step 520, a path matrix based on input graph is generated from the input graph.

In step 530, the path matrix is processed to satisfy various imposed conditions. For example, in certain implementations the processing normalizes the path matrix and determines if bistochasticity condition is satisfied, and if not processing can be performed to adjust the row (column) values to ensure bistochasticity.

In step 540, an eigen-decomposition is computed to generate eigenvalues and eigenvectors for the normalized matrix.

In step 550, a diagonal matrix of the eigenvalues is generated, and path power matrices are generated, wherein the n-path power matrix represents paths n links, respectively.

In step 560, surrogate ranking operator (or path-adjusted surrogate ranking operator) is computed.

Variations of method 100 can be implemented without deviating from the spirit of the method, as would be understood by a person of ordinary skill in the art.

In certain implementations, the SRO can be an augmented surrogate ranking operator. For example, in the case that there is external meta-data to label the data items, additional rows and columns comprising the meta-data relationship to the data can be added to the first order path matrix (e.g., an author network and rank in the context of a network such as the World Wide Web). The process then proceeds as before. This step can be used to augment or personalize the matrix.

In certain implementations, the SRO can be a biased surrogate ranking operator. For example, the SRO can be operated upon by a preference-matrix. This provides a personalized preference over ranking and the preferences are computed on a per user basis. This enables personalized indexing and search. For example, a preference matrix can be introduced as a matrix inserted in the process of calculating the power matrices before the power series is calculated to generate the SRO. In certain implementations, a personal preference matrix, relative to a general population used to generate the SRO, can be learned and applied to a state vector representing the ranking criteria, or can be applied directly to the SRO after it has been calculated.

As discussed above, there are different ways in which network nodes can be interrelated. In FIG. 2, the nodes are related by weighted edges. However, in other networks the nodes might be simply connected by edges without weights, or in a more complicated scenario the edges could be directed. Still in other networks/graphs the connections/edges can include expressions of similarity or affinity/like, which might be expressed as a sign of the edge. Accordingly, different types of first-order path matrices can be used to express the relationships in these different types of networks/graphs, and, consequently, different types of SROs will result from these different types of first-order path matrices. Nevertheless, the generalization of the above-described method 100 and processes 110, 120, and 130 to the other data types would be straightforward and would not depart from the spirit of the invention, as would be understood by a person of ordinary skill in the art. Several of the types of links between network nodes are listed in Table 2 together with the type of numbers/data structure used to represent them in the first-order path matrix and SRO and the semantics which the link types convey. Accordingly, the surrogate ranking operator comes in several distinct semantic types as show in Table 2.

TABLE 2

Surrogate Ranking Operator Types and their Semantics

| Type | Links | Representation | Semantics |
|---|---|---|---|
| 1 | Undirected | Matrix of reals | Correlations |
| 2 | Unidirectional | matrix of bivectors (complex numbers) | Associations |
| 3 | Bidirectional | Matrix of split-complex (bicomplex numbers) tessarines | Orientations |
| 4 | Mixed | Matrix of multivectors | Attitudinal |

Figure 6:
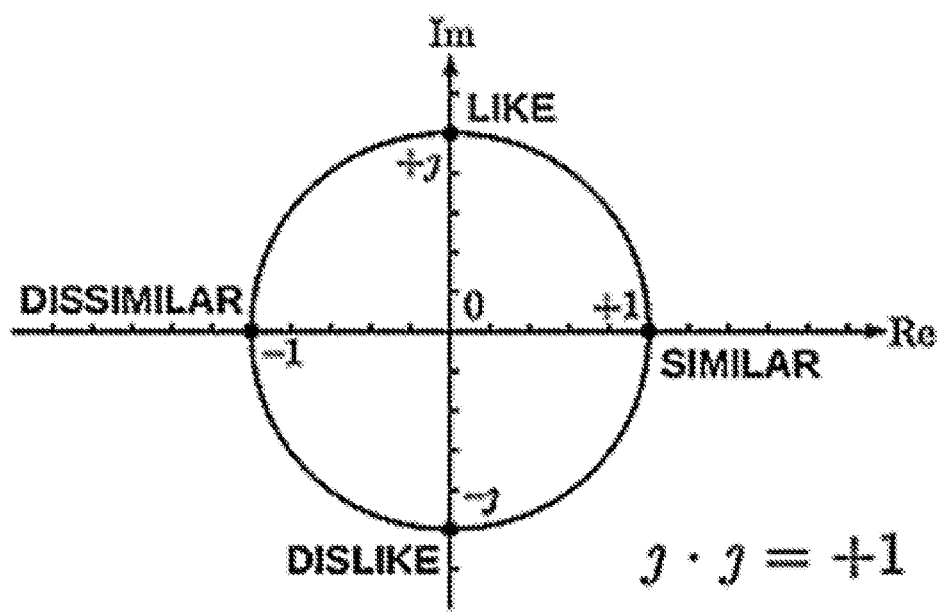
FIG. 6 shows an example of using bicomplex numbers to represent bidirectional links, according to one implementation.

The split-complex numbers were introduced in 1848 by James Cockle: they are a special case of the tessarines and so were called real tessarines. The bicomplex numbers form a ring and not a field like the reals. The split-complex numbers are often studied together with number systems such as the quaternions, for instance by William Clifford in 1873. Split-complex numbers are also called bicomplex or hyperbolic complex numbers because they can represent hyperbolic angles. However the interpretation is that orientations can be encoded such as synonymy versus antonymy or similarity versus dissimilarity or likes versus dislikes in preferences as illustrated in FIG. 6.

Also, as discussed above, the SRO is inspired, in part, by analogies in quantum mechanics and quantum graph theory. For example, in quantum mechanics, the fundamental equation is the Schrodinger equation $$i\hbar \frac{\partial \Psi_t}{\partial t} = H\Psi_t,$$

Which can be solved in the Heisenberg picture using the unitary evolution operator $U_t = e^{i\hbar tH}$, such that $$\psi_t = U_t \psi_0.$$

In particular, when the potential U(x) is zero the Hamiltonian simplifies to a value proportional to a Laplacian $\nabla^2$;

$$H = -\frac{\hbar^2}{2m}\nabla^2 + U(x) \propto -\nabla^2.$$

Further, in graph quantum mechanics the, the graph Laplacian $\nabla^2$ is the adjacency matrix plus a diagonal matrix of the valance of the respective vertices of the graph. A person of ordinary skill in the art would recognize that this the discretized second order derivative. It can also be noted that this Laplacian operator is a variation of a first-order path matrix and is related to the first-order path matrix T described above. Further, the evolution operator $U_t$ is related to the SRO, except in the SRO the terms $i\hbar t/2m$ are set to one (e.g., in certain implementations the SRO can be viewed as a diffusion equation rather than a wave equation).

In view of the above similarities, some of the theoretical apparatus of quantum mechanics and quantum field theory can be utilized to generate and apply the SRO. Accordingly, not only graph theory but also quantum graph theory can be applied to the problem of rapidly ranking vertices based on a given ranking criteria. That is the SRO represent concepts that are rooted in the foundations of graph theory and that these concepts can be extended from graph theory to quantum graph theory.

Certain implementations of the methods described herein use a general approach to network theory for the semantics and behavioral properties of associating density matrices (as well as eigen-elements) of graphs of both combinatorial and signless Laplacian matrices associated with corresponding weighted directed graphs with complex edge weights where the graphs can be acyclic or cyclic.

One advantage of leveraging the tools of quantum graph theory is that quantum theory has been formulated by Richard Feynman using a sum-over-histories, which carries over into the graph theory and enables the SRO to perform in a single step what would otherwise require a computationally intensive multi-step process of recursively traversing nodes of the network.

For example, in one approach to graph theory (i.e., Quantum Graph Theory, as discussed in P. Mnev, "*Quantum mechanics on graphs*," MPIM Jahrbuch 2016, available at, https://www3.nd.edu/~pmnev/graphQM.pdf, incorporated herein by reference in its entirety) the modularity of graphs is used to compute a discretization of the Feynman path integral. These path-integral results provide counts of paths having topological invariants characteristic of types of graphs. This can apply to models of propagation of information in networks such as internet-networks, social networks, and linguistic (semantic) networks, complexity measures and potentially also material science parameterization.

This path integral formulation of quantum mechanics can be recast from the Schrodinger time evolution wave equation, and the above discussion, as well as the additional discussion below, illustrates how paths in a graph are formulated based on such a path integral based approach and also how this works within the context of a wave equation. As discussed above the Laplacian operator $\nabla^2$ is a first-order path matrix defined in terms of an adjacency operator and a valency operator. We can:
1. Define the adjacency operator (i.e. the matrix of vertex adjacencies, a coboundary): A
2. Define the valency operator (i.e. the cardinality of incidences at vertices, a boundary): $\nu$
3. Define the incidence operator with respect to a chosen orientation, which maps an edge to the difference of its endpoints (boundary and coboundary): $\Gamma$ Then, the Laplacian operator is defined as: $\nabla^2 = \nu - A = \Gamma\Gamma^*$.

In certain implementations, the definition of the graph Laplacian can be applied to generate the first-order path metric using the values of links/edges between nodes/vertices to generate a link dependent diffusion coefficient of a diffusion finite difference equation. For example, the diffusion equation can be expressed as $$\frac{\partial \Phi}{\partial t} = D\nabla^2 \Phi,$$

wherein D is a diffusion coefficient. The diffusion equation in one dimension can be approximated by the difference equation $$\varphi_{t+1,x} = \varphi_{t,x} + \frac{D\Delta t}{\Delta x^2}(\varphi_{t,x-1} + \varphi_{t,x+1} - 2\varphi_{t,x}),$$

wherein $\varphi_{t\pm 1,x\pm 1} = \Phi(t\pm\Delta t,x\pm\Delta x)$ the term in parenthesis on the right hand side can be recognized as being the graph Laplacian for a graph representing a Cartesian grid with spacing $\Delta x$ in the x-direction. If the diffusion coefficient is allowed to vary as a function of position, then the difference equation becomes $$\varphi_{t+1,x} = \varphi_{t,x} + \frac{\Delta t}{\Delta x^2}(D_{x-1}\varphi_{t,x-1} + D_{x+1}\varphi_{t,x+1} - (D_{x+1} + D_{x-1})\varphi_{t,x}).$$

In two dimensions the difference equation becomes $$\varphi_{t+1,x,y} =$$
$$\varphi_{t,x,y} + \frac{\Delta t}{\Delta x^2}(D_{x-1,y}\varphi_{t,x-1,y} + D_{x+1,y}\varphi_{t,x+1,y} - (D_{x+1,y} + D_{x-1,y})\varphi_{t,x,y}) +$$
$$\frac{\Delta t}{\Delta y^2}(D_{x,y-1}\varphi_{t,x,y-1} + D_{x,y+1}\varphi_{t,x,y+1} - (D_{x,y-1} + D_{x,y+1})\varphi_{t,x,y}).$$

Arranging $\varphi$ at time t as a vector (i.e., $V_t = [(\varphi_{t,x,y}, \varphi_{t,x+1,y}, \varphi_{t,x+1,y+1}, \ldots, \varphi_{t,x+n,y+n}])$, the above difference equation can be expressed as a matrix equation $V_{t+1} = M V_t$. In which the matrix M satisfies the bistochasticity condition similar to certain implementations of the first-order path matrix. Further comparisons between the matrix M and the first-order path matrix reveal that, in certain implementations, the first-order path matric can be understood as a graph diffusion operator corresponding to a particular choice of $\Delta t/\Delta x^2$ and $\Delta t/\Delta y^2$ and with a "spatially" varying diffusion coefficient corresponding to the link/edge weights between nodes/vertices. The primary difference is that, unlike the matrix M, the first-order path matrix is not limited to a uniform Cartesian grid, but can be generated on any graph. Further, the analogy to diffusion can be generalized, as would be understood by a person of ordinary skill in the art, to cases in which links between nodes include information and relations beyond weighting, such as directionality, orientations, and attitudinal relations between nodes, as discussed above (see, e.g., FIG. 6 and Table 2).

Also, as discussed above, in certain implementations, removing redundancies can be important to generating. For example, the path from one node to some other node: $p \to s$ can included redundancies. Assuming that there is a chain: $p \to q$, $q \to r$, $r \to s$. Therefore, taking the adjacency operator, A, the paths, X is:

$$X(p \to s) = A^3_{p \to s} = \sum_{p \to s} A_{p \to q} A_{q \to r} A_{r \to s}$$

Therefore, for an integer enumeration $N = \{1, 2, \ldots, n\}$ and the path set $X = \{p, q, r, s\}$, the path set can be seen as a discrete path in the set N from p to s. As discussed above, within a path set there can be redundancies, but these can the accounted for and overcome using the methods described above. That is, in certain implementations, the path adjusted ARO is used to account for the fact that the matrix coefficients of the powers of the first-order path matrix are equivalent to sums of terms; one term for each path from some column index to some row index, and that redundancies can be accounted for in order to not double-count contributions when multiple terms correspond to the same path, as discussed in C. Yu "Super-Walk Formulae for Even and Odd Laplacians in Finite Graphs," Rose-Hulman Undergraduate Mathematics Journal, Volume 18, No. 1, Spring 2017, incorporated herein by reference in its entirety.

Returning to the discussion of generating the SRO, in quantum mechanics the evolution operator is generated by exponentiating a matrix H (e.g., the Hamiltonian) as follows:

$$U_t = e^{tH}.$$

Analogously, the matrix coefficients of $U_t$ are integrals (analogous to the sum) over continuous paths in the space, S, whose discrete representation is a graph, a sequence of node to node intervals interspersed with jumps. For the quantum case it is a wave equation that includes an imaginary number in the exponent, but for the graph Planck's constant is dropped, as given by the equation $$U_t = e^{itH}$$

This equation can be further analogized in the sense that in quantum field theory, the operators act on a Hilbert space where states are complex valued functions on R and $U_t$ is an integral operator (representing the potential in the field).

Once the operations are discrete and in a graph, they are finite dimensional and $U_t$ can be developed in a discrete path integral formalism for computation as interaction since no system is closed nor separated from the external system (i.e. there is boundary of interactions at which computations occur unlike classically idealized systems which are treated as fully insulated). In QFT the evolution of states is described by a partition function that acts as a solution to the Schrodinger operator:

$$\frac{\partial \Psi_t}{\partial t} = -\Delta \Psi_t = e^{(-\Delta t)\Psi_0}; Z(t) = e^{(-\Delta t)}$$

Here, we see that Z(t) is the partition function. Different partition functions can be designed for different graphs. For example, in certain implementations, the partition function can take the form, for t=[0 ... ∞), $$Z_G(t) = \sum_{k=0}^{\infty} \frac{A^k}{\frac{1}{2\sqrt{5}}\left[\left(\frac{1+\sqrt{5}}{2}\right)^k - \left(\frac{1-\sqrt{5}}{2}\right)^k\right]} t^k = e^{(tA_G)}$$

There are several important consequences to this form of the partition function, including the relationships of Z as the partition function to quasicrystalline structures. Different choices of the partition function used to calculate the SRO will have different advantageous effects for ranking the vertices of the graph.

Given an initial state (e.g., the input vector expressing the ranking criteria), the evolution of states is computable using a partition function: the partition function pays the role of the evolution operator, and the graph Laplacian in turn forms the basis for the evolution operator.

The evolution of a system in QFT is determined by a Partition Function Z(M), where M is a manifold which models the space of fields (in our case, our graphs seen from the viewpoint of fields). Its behavior depends on the combinatorics of the network itself. Further, the partition function associated to the graph is an exponential, and the argument of the exponential is selected according to desired outcome/inquiry. For example, for an inquiry regarding ranking an Adjacency operator is used as the argument (e.g., the first-order path matrix T). On the other hand, for an inquiry regarding or the propagation of information the argument in the exponential can be the Laplacian operator multiplied by an imaginary number. By analyzing the spectrum of these operators, explicit solutions are produced to the ranking or propagation questions. Further, in casting the partitioning function in terms of charts and atlases the gluing property of Z(M) can be characterized, and, therefore, provide quantitative characterization when merging two networks (as in information fusion, database warehousing, interoperability and many other behaviors).

Using the SRO, as described herein, to perform a ranking of a network has several advantages over conventional methods. For example, the methods described herein implement a unique approach to calculating the relative ranking between vertices, or nodes, in a network (e.g., networks to which the methods can be applied include cybersecurity, medical informatics, social, symbolic, semantic, Web networks, etc.). The ranking operator computes the ranking based on input ranking criteria (i.e., a state vector representing data elements of the type represented at the network nodes), and orders the nodes in accordance with the ranking.

The nodes are not restricted to a particular type. For example, the nodes can be raw data, but the nodes can also be a network of agents, as discussed in U.S. patent application Ser. No. 14/965,728 and U.S. patent application Ser. No. 14/971,769, both of which are incorporated herein by reference in their entirety. A network of agents can be trained, for example, using a machine learning method, and the network connections used for the first-order path matrix once the network has reached a Nash equilibrium by training on raw data (e.g., empirical measurements) that is used as the training data.

Accordingly, the ranking operator maps one state vector, which is the state represented by positions of nodes in a graph, to another state vector, which is the state represented by ranks between nodes in a sub-graph. By virtue of these attributes, the methods described herein enable convergence to a unique dominant eigenvector without the need for a "fudge factor" to force irreducibility, as used by PageRank, for example. Further, the methods described herein enable greater accuracy to distinguish among elements of ranked vectors. That is, the SRO is a precise and accurate construct of the underlying relational network structure. The methods described herein further enable personalization (e.g., using the preference-matrix to modify and personalize an SRO learned using data from a general population). Accordingly, the methods described herein provide a general approach to network ranging for tasks such as information retrieval and recommendation engines, to name just a few of the many applications that are benefited by the SRO.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, define, in part, the scope of the foregoing claim terminology such that no inventive subject matter is dedicated to the public.

Features of the invention can be implemented using some form of computer processor. As one of ordinary skill in the art would recognize, the computer processor can be implemented as discrete logic gates, as an Application Specific Integrated Circuit (ASIC), a Field Programmable Gate Array (FPGA) or other Complex Programmable Logic Device (CPLD). An FPGA or CPLD implementation may be coded in VHDL, Verilog or any other hardware description language and the code may be stored in an electronic memory directly within the FPGA or CPLD, or as a separate electronic memory. Further, the electronic memory may be non-volatile, such as ROM, EPROM, EEPROM or FLASH memory. The electronic memory may also be volatile, such as static or dynamic RAM, and a processor, such as a microcontroller or microprocessor, may be provided to manage the electronic memory as well as the interaction between the FPGA or CPLD and the electronic memory.

Alternatively, the computer processor may execute a computer program including a set of computer-readable instructions that perform the functions described herein, the program being stored in any of the above-described non-transitory electronic memories and/or a hard disk drive, CD, DVD, FLASH drive or any other known storage media. Further, the computer-readable instructions may be provided as a utility application, background daemon, or component of an operating system, or combination thereof, executing in conjunction with a processor, such as a Xenon processor from Intel of America or an Opteron processor from AMD of America and an operating system, such as Microsoft VISTA, UNIX, Solaris, LINUX, Apple, MAC-OSX and other operating systems known to those skilled in the art.

Figure 7:
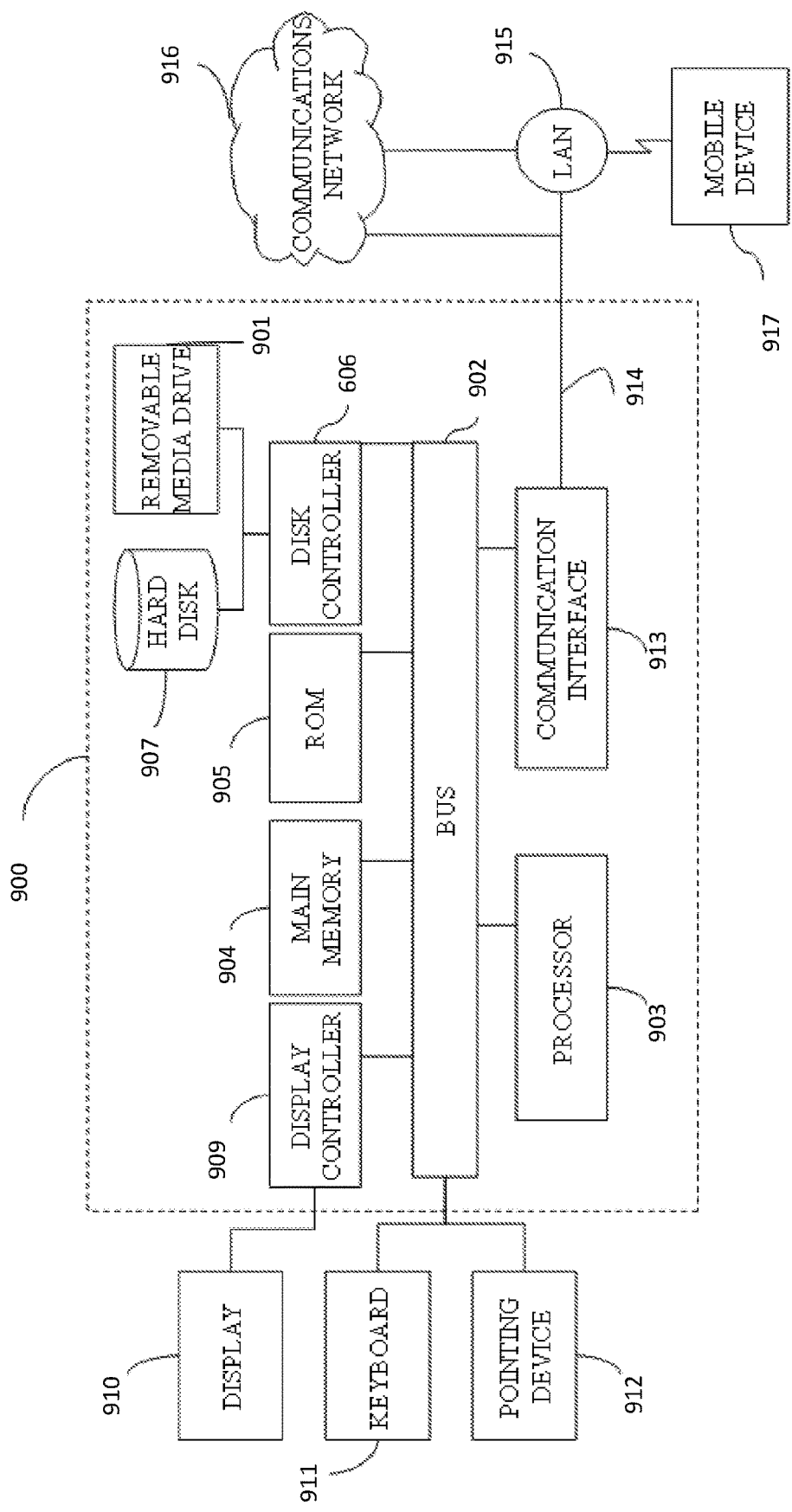
FIG. 7 shows an example of computing hardware implementing the method of ranking the network nodes based on the input ranking criteria.

In addition, the invention can be implemented using a computer based system 900, as exemplified in FIG. 7. The computer 900 includes a bus B or other communication mechanism for communicating information, and a processor/CPU 904 coupled with the bus B for processing the information. The computer 900 also includes a main memory/memory unit 903, such as a random access memory (RAM) or other dynamic storage device (e.g., dynamic RAM (DRAM), static RAM (SRAM), and synchronous DRAM (SDRAM)), coupled to the bus B for storing information and instructions to be executed by processor/CPU 904. In addition, the memory unit 903 may be used for storing temporary variables or other intermediate information during the execution of instructions by the CPU 904. The computer 900 may also further include a read only memory (ROM) or other static storage device (e.g., programmable ROM (PROM), erasable PROM (EPROM), and electrically erasable PROM (EEPROM)) coupled to the bus B for storing static information and instructions for the CPU 904.

The computer 900 may also include a disk controller coupled to the bus B to control one or more storage devices for storing information and instructions, such as mass storage 902, and drive device 906 (e.g., floppy disk drive, read-only compact disc drive, read/write compact disc drive, compact disc jukebox, tape drive, and removable magneto-optical drive). The storage devices may be added to the computer 900 using an appropriate device interface (e.g., small computer system interface (SCSI), integrated device electronics (IDE), enhanced-IDE (E-IDE), direct memory access (DMA), or ultra-DMA).

The computer 900 may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)).

The computer 900 may also include a display controller 909 coupled to the bus 902 to control a display, such as a cathode ray tube (CRT), for displaying information to a computer user. The computer system includes input devices, such as a keyboard 911 and a pointing device 912, for interacting with a computer user and providing information to the processor. The pointing device 912, for example, may be a mouse, a trackball, or a pointing stick for communicating direction information and command selections to the processor and for controlling cursor movement on the display. In addition, a printer may provide printed listings of data stored and/or generated by the computer system.

The computer 900 performs at least a portion of the processing steps of the invention in response to the CPU 904 executing one or more sequences of one or more instructions contained in a memory, such as the memory unit 903. Such instructions may be read into the memory unit from another computer readable medium, such as the mass storage 902 or a removable media 901. One or more processors in a multi-processing arrangement may also be employed to execute the sequences of instructions contained in memory unit 903. In alternative embodiments, hard-wired circuitry may be used in place of or in combination with software instructions. Thus, embodiments are not limited to any specific combination of hardware circuitry and software.

As stated above, the computer 900 includes at least one computer readable medium 901 or memory for holding instructions programmed according to the teachings of the invention and for containing data structures, tables, records, or other data described herein. Examples of computer readable media are compact discs, hard disks, floppy disks, tape, magneto-optical disks, PROMs (EPROM, EEPROM, flash EPROM), DRAM, SRAM, SDRAM, or any other magnetic medium, compact discs (e.g., CD-ROM), or any other medium from which a computer can read.

Stored on any one or on a combination of computer readable media, the present invention includes software for controlling the main processing unit, for driving a device or devices for implementing the invention, and for enabling the main processing unit to interact with a human user. Such software may include, but is not limited to, device drivers, operating systems, development tools, and applications software. Such computer readable media further includes the computer program product of the present invention for performing all or a portion (if processing is distributed) of the processing performed in implementing the invention.

The computer code elements on the medium of the present invention may be any interpretable or executable code mechanism, including but not limited to scripts, interpretable programs, dynamic link libraries (DLLs), Java classes, and complete executable programs. Moreover, parts of the processing of the present invention may be distributed for better performance, reliability, and/or cost.

The term "computer readable medium" as used herein refers to any medium that participates in providing instructions to the CPU 904 for execution. A computer readable medium may take many forms, including but not limited to, non-volatile media, and volatile media. Non-volatile media includes, for example, optical, magnetic disks, and magneto-optical disks, such as the mass storage 902 or the removable media 901. Volatile media includes dynamic memory, such as the memory unit 903.

Various forms of computer readable media may be involved in carrying out one or more sequences of one or more instructions to the CPU 904 for execution. For example, the instructions may initially be carried on a magnetic disk of a remote computer. An input coupled to the bus B can receive the data and place the data on the bus B. The bus B carries the data to the memory unit 903, from which the CPU 904 retrieves and executes the instructions. The instructions received by the memory unit 903 may optionally be stored on mass storage 902 either before or after execution by the CPU 904.

The computer 900 also includes a communication interface 905 coupled to the bus B. The communication interface 904 provides a two-way data communication coupling to a network 916 that is connected to, for example, a local area network (LAN), or to another communications network such as the Internet. For example, the communication interface 915 may be a network interface card to attach to any packet switched LAN. As another example, the communication interface 905 may be an asymmetrical digital subscriber line (ADSL) card, an integrated services digital network (ISDN) card or a modem to provide a data communication connection to a corresponding type of communications line. Wireless links may also be implemented. In any such implementation, the communication interface 905 sends and receives electrical, electromagnetic or optical signals that carry digital data streams representing various types of information.

The network 916 typically provides data communication through one or more networks to other data devices. For example, the network may provide a connection to another computer through a local network 915 (e.g., a LAN) or through equipment operated by a service provider, which provides communication services through a communications network. The local network and the communications network use, for example, electrical, electromagnetic, or optical signals that carry digital data streams, and the associated physical layer (e.g., CAT 5 cable, coaxial cable, optical fiber, etc). Moreover, the network may provide a connection to, and the computer 900 may be, a mobile device such as a personal digital assistant (PDA) laptop computer, or cellular telephone.

As discussed above, in many cases network/graph representations are not known a priori, and must instead be learned from empirical measurements and data. Various conventional methods are known, such as artificial neural networks (ANNs) and other, to learn patterns based on training data. However, these conventional methods have various drawbacks. Accordingly, better methods of network and pattern learning are desired, which will apply faster, more robust approaches to efficiently learn and model networks and patterns Further, conventional methods of machine learning have serval disadvantages. For example, conventional AI appraoches lack contextual capability and minimal reasoning ability. Conversely, symbolic methods are good at reasoning over defined problems, but have no learning capability and poor handling of uncertainty. If these approaches could be combined, the strengths of one paradigm might compensate for the deficiencies of the other, and vice versa. However, any system that endeavors to combine multiple paradigms requires a great deal of specialized labor to tailor the components, make them work together, and test the many combinations on desired outputs. Even then the result might not be robust to changes.

The methods and apparatus described herein overcome the above-discussed deficiencies in conventional machine learning methods, and can robustly generate a network from which the SRO can be generated. For example, the methods described herein provide an approach to machine learning that can straightforwardly and robustly be integrated with symbolic methods and other machine learning methods. In certain implementations, the methods described herein provide an approaching to machine learning that efficiently combines multiple AI paradigms into a flexible, fault-tolerant system. The ensemble/network of different algorithms, which are referred to as agents, is controlled by concepts from economics, including (i) a preference function, (ii) a utility function, and (iii) an objective function. Each agent is endowed with a reasoning paradigm (e.g., belief network, decision tree, etc), or preference function. Based on the agent's respective reasoning paradigm or preference function, the agent then seeks to optimize an objective function (e.g., profit, utility, reward functions, etc.), assigning a real number to its preferences. Using training data, the agents learn by interacting with other agents in the ensemble/network in accordance with the principles of game theory. Viewing these interactions between agents in the context of a game, it is understood the agents will converge to a Nash Equilibrium. The Nash Equilibrium represents the stable point of an agent in a decision landscape based on the training data and the agent's method for reasoning and classification over that data. This stable decision point can be considered as the state vector of a learned state of the agent in that space.

Further, this learned state can be used as an index over learned data without needing to store the original data itself. In fact, the learned state can be treated as a single model that can be saved, stored, retrieved, used, or even re-combined with other diverse or similarly learned models to a size and depth limited by the users' choices of learning parameters. For example, a learned state be captured at a given time can using the surrogate ranking operator (SRO) described herein, and is described in more detail in U.S. Patent Application Publication No. (corresponding to Attn'y Dkt. No. 506878US) and in Provisional Patent Application No. 62/460,570, both of which are incorporated herein by reference in their entirety.

Because the agents interact based on an economics model using a common "currency," different, various different AI paradigms/models can be seamlessly and robustly integrated. Further a hierarchy of agent networks can be created in which an smaller economy of interacting agents at one level can be bundled as a single agent having a collective output that interacts at second level within a larger economy of other agents at the second level, as described for example, in U.S. patent application Ser. No. 14/965,728 and U.S. patent application Ser. No. 14/971,769, both of which are incorporated herein by reference in their entirety.

As discussed above, conventional methods in contrast to the methods described herein, unavoidably have several intrinsic deficiencies, including, e.g.:

(1) Inadequate information due to missing model variables and relationships;
(2) Intrinsic data revisions over short to longer time periods; and
(3) Fluctuations and disturbances that while weak may have significant impacts.

The methods described herein overcome these deficiencies by virtue of the attributes discussed below. For example, methods described herein provide a unital learning model that addresses these deficiencies by building a flexible, fault-tolerant system, adapting to data revision while maintaining sensitivity to weak signals in the data. Additionally, the machine learning procedure exhibits fast convergence to a learned state and ease of implementation, speed, and handling of complexity. Further, the same can be said of the ranking operator synthesis methods (e.g., the method for generating the SRO). The methods described herein provided a model that is "unital" because it relies on unitary bistochastic matrix structures.

The term "unital" is used extensively in abstract algebra to refer to an algebraic structure which contains a unit. The term "unital," as used herein, also refers to such a structure, but one which is internally composed of non-identity units (i.e., heterogenous players representing properties of data) to the input data to avoid models that consist of identities to the data (i.e. the trivially learned model whose size is identical to the size of the input data). Accordingly, as used herein the recited "unital model" is a network of various algorithms that interoperate and cooperate by using a common perceptual language (e.g., the economic model of exchanging information among agents as a common currency) to learn patterns that approximate input data to arbitrary precision, fidelity, and accuracy.

Figure 8:
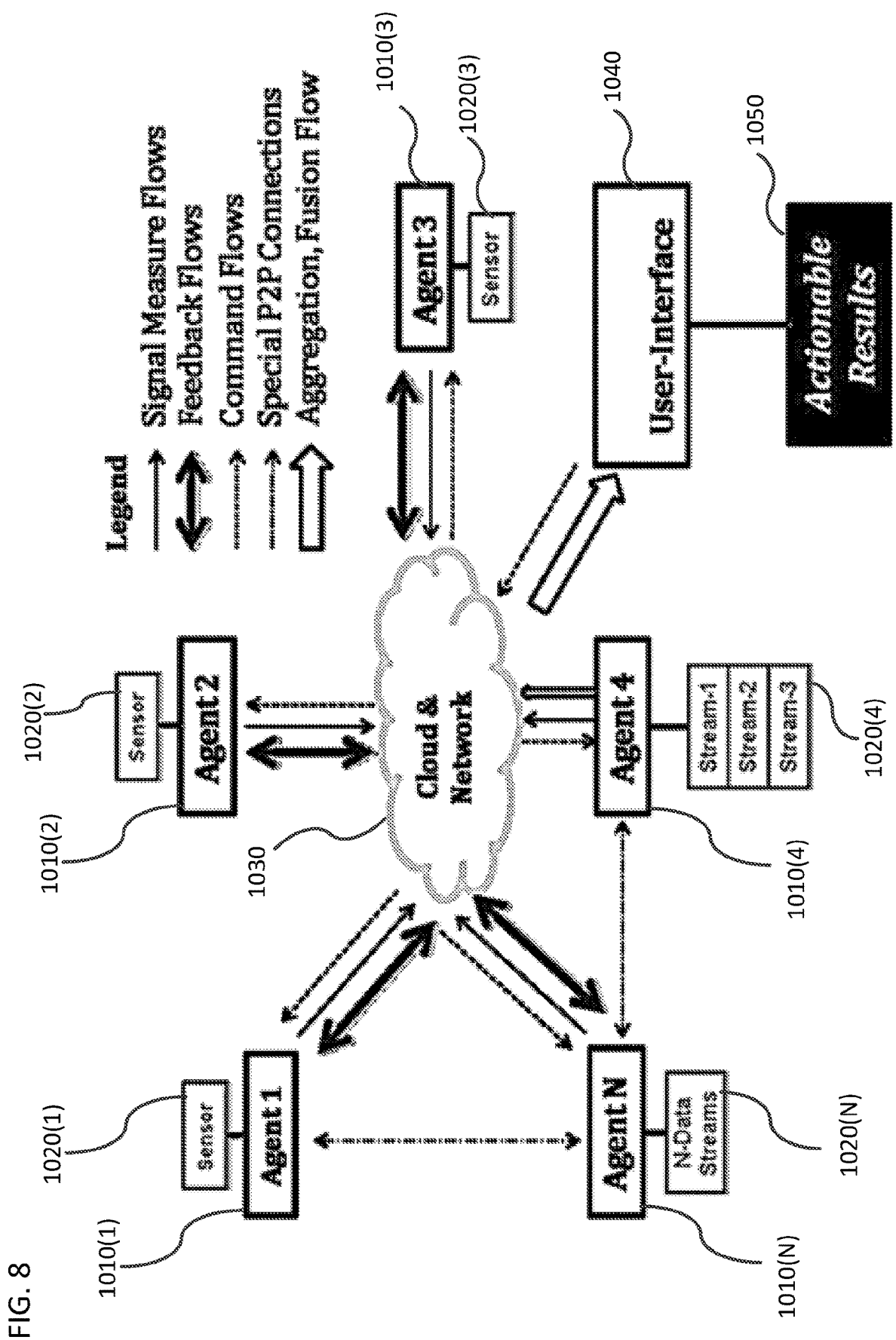
FIG. 8 shows an example of a network of software agents, according to on implementation.

Referring now to the drawings, wherein like reference numerals designate identical or corresponding parts throughout the several views, FIG. 8 shows a schematic diagram of a network 1000 of agents 1010(1) through 1010(N). As shown in FIG. 8, the agents 1010(1)-(N) can communicate via a communication network 1030, and, in certain implementations, the communication network 1030 be configured have a cloud-based architecture or the can be implemented on any other computational or communication architecture. At the lowest level, agents receive information about and perceive the "world" through respective sensors 1020(1)-(3). At higher levels, agents receive data streams 1020(4)-(N) from lower level and/or similar situated agents. For example, if the agents analyze a text stream they would receive a series of words and processes these to generate a signal/signature representing the perception of the data from the vantage point and preferences of the agent. The agents can express their preferences for particular types of information by exchanging information via metadata exchanges through links to other agents (e.g., via special per-to-per (P2P) connections). Information can also be passed up a hierarchy of agents and aggregated by higher layer level/ layer agents until actionable results 1050, such as a report, are generated which can be, e.g., provided to a user through a user interface 1040.

By way of non-limiting example, in certain implementations, the aggregation and distillation of low level data to higher level concepts and meaning is referred to as taking data and generating semenatic atoms called sematons, which are in turn refined and distilled at a higher level in which patterns a discerned in combinations of sematons, which are called Gestalts. Thus, the network of agents learns by synthesizing new patterns or Gestalts within social and cultural contexts. For example, U.S. patent application Ser. No. 14/965,728, which is incorporated herein by reference in its entirety, describes that these Gestalts can be used in novel contexts to identify analogous situations in which the original data no longer appears. This greatly enhances the users productivity because the system draws analogies from user input and creates new possibilities that a single user could not conceive. Accordingly it is possible to use intelligent software agents to form a robust cognitive model that can deal with structured and unstructured data by self-organization into ensembles of classifiers or decision makers. That is, in this non-limiting example, agents are integrated and evolve as a society/network of agents, which occurs at various scales and levels of a hierarchy. For example, agents within a network have respective preference functions, which they seek to maximize through exchanges of information/metadata.

Further, U.S. patent application Ser. No. 14/971,769, which is incorporated herein by reference in its entirety, provides another non-limiting example of agents called hierarchical semantic boundary indices, in which a hierarchy of agents evolves and distills information from various data streams.

As discussed above, by virtue of the interactions among agents, the methods described herein enable a hybrid combination of new algorithms within the framework of multi-agent technology. Thus, applications of the methods described herein can be built based on agents that compute in a society, where a society is cohesive network. Agents can virtually communicate or move along the vertices of the network they are part of to evolve their configuration space. Agents convert data to decisions, and their performance and efficiency is measured in work using a virtual currency instead of in direct computation resources.

Further, the agents can use a distributed shared memory model, where they store and extract information using the graph's vertices. The distributed shared memory model's strengths are that it is much easier to implement and maintain (than, for example, centralized models), highly fault tolerant and has high scalability, and the quality of the results it produces is very high, compared to the strongest models of complete knowledge sharing (such as the largest Expert Systems and their associated truth maintenance systems).

Agents have "brains" with capabilities ranging from simple insect-like sensing to high-level reasoning. By collaborating, sophisticated agents can acquire data from simpler agents and work with "colleagues" that use different algorithms: an agent that uses analogy to guess a solution can pass hypotheses to an agent that may verify them by deduction, or to an agent that uses statistics to estimate their likelihood. High-speed perception of intelligence in massive data streams is achieved by indexing the groups of agents that collaboratively sense patterns in data streams.

Using the methods described herein, queries can be answered at the lowest layers using inductive, deductive, and abductive reasoning in a pragmatic cycle, as described below with reference to FIG. 9. The query results are then abstracted, fused, and propagated upward as evidential patterns that higher-level agents recognize. The pattern structures result from the lower-level percepts that are propagated up to the next layer in the hierarchy of agents as signals, which are interpreted as high-level cognitive representations. These representations are percepts that are aggregated into gestalts forming a semantic field-like data representation.

Every agent encapsulates one or more models that generate one or more hypotheses about a theory of the data based on its perceptions from the lower-level agents. An agent chooses those models and hypotheses that it has learned to rate as best suited to its own self-interest in terms of 1) A utility function;
2) An objective function; and,
3) A preference function.

As discussed above, a model can be as simple as an insect-like response in an agent or as complex as a society or grouping of agents together that act as an ensemble classifier, providing percepts on underlying data. Therefore, each individual agent can discover which society of agents it should join based on its own self-interest. In the language of game theory, the agents are presented with a choice (e.g., which agents to exchange information with) and seeks to optimize its self-interest. If after making a choice the agent observes that a different choice would have a more favorable outcome (i.e., better optimize its self-interest) then the agent changes its choice at the next iteration. Eventually, equilibrium will be achieved when no better choice is to be had, and this is called the Nash Equilibrium.

Figure 9:
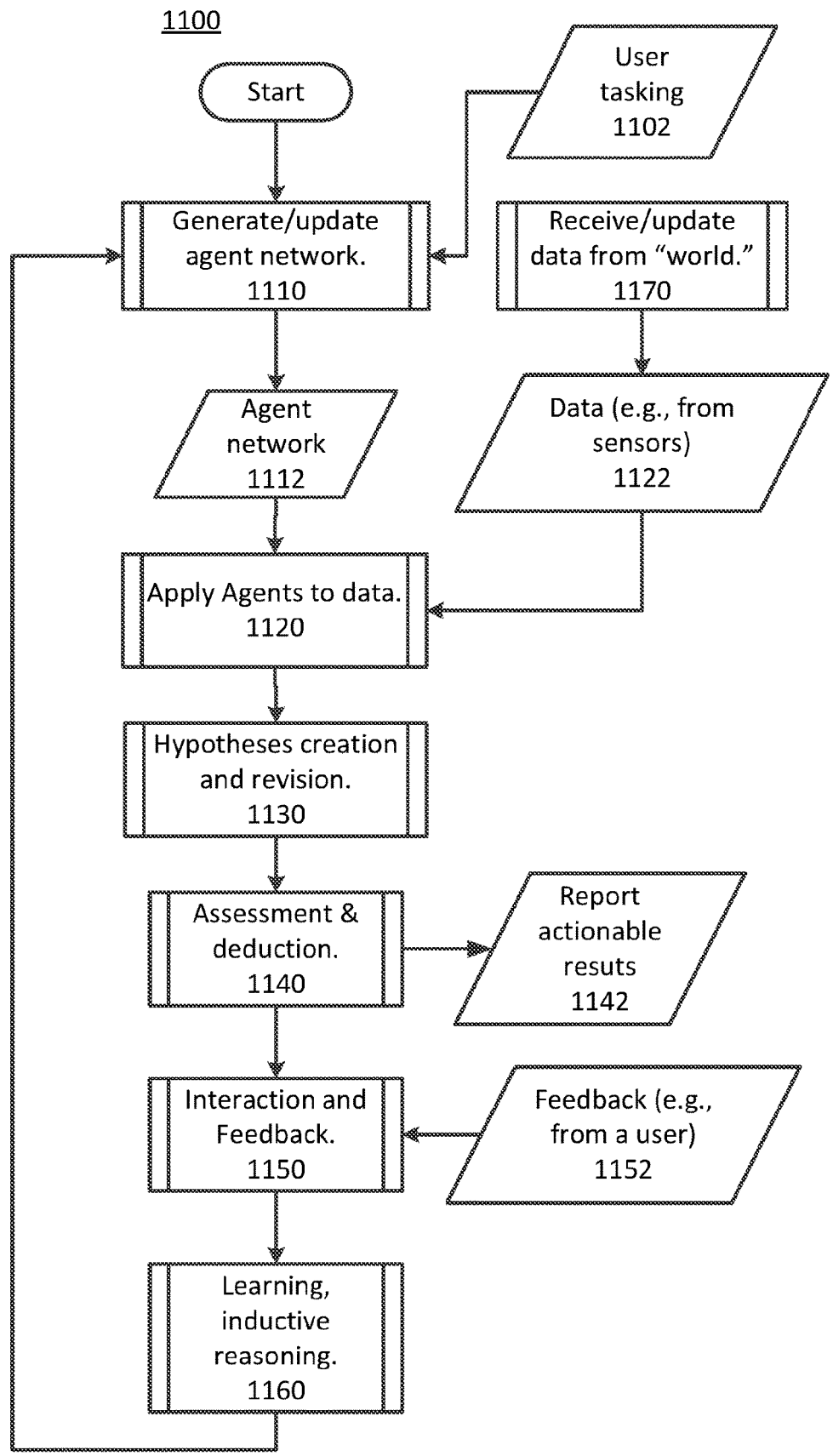
FIG. 9 shows an example of a flow diagram of a method of agent learning in a network, according to on implementation.

FIG. 9 shows a flow diagram of one implementation, of a network of agents learning and then continuing to adapt to a changing environment. In contrast to conventional method that pipeline machine processing, which can produce overwhelming amounts of irrelevant analysis, the methods described herein enable the network of agents to reflect on its own effectiveness to produce high-quality, insightful information from Big Data. For example, the network of agents uses a model for collaborative intelligence, such as described in M. Minsky, *Society of Mind*, Simon and Schuster (1988), which is incorated herein by reference in its entirety. In this model, a collection of autonomous and modular components have localized capabilities for perceiving and reasoning. Further, this model assumes that, in the aggregate an ensemble of simple decision makers, can supersede the performance of any subject matter expert(s) in problem solving. The gestalt principles discussed above for hierarchical re-representations are used to map from low-level data to high-level concepts and patterns.

In FIG. 9, when the system is first launched, agent populations 1112 are initiated/created (and then latter updated) in process 1110, and the system is ready to start receiving inputs from sources connected to the data sources (e.g., the sensors and data streams in FIG. 8). The overall goal is set by the task assigned by a user (i.e., the user tasking 1102). That is, even though a system is receiving data 1122, it does not do anything without the initial human operator input goal (i.e., the user tasking 1102). Therefore, in certain implementations, method 1100 begins with the analyst providing the user tasking 110. For example, at process 1110 of method 1100, the analyst has tasked the agents with a specific business requirement, such as "identify rogue traders" from sources that may include single or multiple rooms and threads of conversations in chats, tweets, blogs, enterprise email, and messaging. The system of agents immediately responds to the request by providing relevant evidential signal schemata and related measurements that were learned earlier from a training period via sample inputs. Therefore, at s process 1120 of method 1100, the agents apply the evidential signal measures to the language streams in the environment that generate a collection of "percepts" that, in aggregate, form a "perception." Percepts at the simplest level are correlations between evidential signal measures and language streams.

In process 1130 of method 1100, the agents act on the perceptions in an abductive process that seeks to explain the "meaning" of what is being perceived by combining background knowledge (which includes heuristics) to synthesize a working "hypothesis." At one extreme end of the scale, when there is total knowledge, the hypotheses fit a known model, while at the other extreme there is no background knowledge and, hence, the system randomly connects percepts into hypotheses by a random process of hypothesis selection. Once a hypothesis has been formulated, the pool of hypotheses is revised. This pool can include user input or feedback and machine learning. The system will usually require feedback from the user if there is no background knowledge available. The feedback is used to generate a relevance constraint to prune out useless conjectures or hypotheses by a competitive mechanism. The revision stage is one of the most complex stages of the system, because it involves using a suite of economic models to assess the "survivability" and, therefore, the plausibility of the hypotheses. During process 1130, agents can trade evidence and hypotheses, then auction off their results. Feedback or other signal measures (from a prior learning process) alters the selection of plausible hypotheses.

In process 1140 of method 1100, the hypotheses are combined/aggregated into a deductive theory that is then used to form a prediction. In our example case, since the analyst requested "Rogue Traders," the system will output its response. At this stage, the response may remain internal to the system or, if the model outputs a sufficiently high relevance score, the response is output as a report to the analyst. Before we consider analyst feedback to the report, let us assume that the system maintains the report "internally" as an ongoing hypothesis because the relevance score was below an analyst's defined threshold value (i.e. that there is insufficient evidence to confirm any claims). At this stage, the system will look for more data to confirm or disconfirm claims.

In process 1150 of method 1100, the network of agents can sample further input and, by feedback on itself. For example, in certain implementations the feedback source can be an analyst/user and/or new input data (e.g., from sensors, a stock market ticker, etc.), and the network of agents can assess the interaction of its partially formed theories using the feedback and alter its theories accordingly.

Regardless of the source of the feedback, in process 1160 of method 1100, the system can learn from the feedback or interaction with data and produce new findings. These findings can prompt new additions to the active agent pool, when method 1100 cycles back to process 1110. The learning and inductive reasoning process in process 1160 augments the pool with new evidence and partial structures that can then feed into another iteration of method 1100. Thus, method 1100 can continually and dynamically adapt to a changing environment. In certain implementations, method 1100 can also include conditional stopping/output criteria, and the operational cycle continues until sufficient evidence, e.g., above a threshold value, triggers the stopping/output criteria, resulting in the generation of a report (or prediction) to the analyst/user.

In view of the above, it can be appreciated that the methods described herein (collectively referred to as the "Model And Pattern Structure Online Unital Learning" (MAPSOUL)) is a computational model for organizing a diversity of data processing algorithms which are represented as players. The ability to organize the players into a workflow in which it is the group of players that produces the capability, not any single player on its own, is what enables MAPSOUL to perform deep pattern learning and pattern recognition. This is achieved in part because MAPSOUL's interpretations are grounded in the assumption of operationally incorrect data and miss-specified algorithms that recast as self-interested players in a general sum game, in which the players are seeking the "truth".

MAPSOUL represents a collection of players as a graph of their connectivity based on their preferred communication patterns to each other and to a special player designated as the "manager". Relationships between players as well as their membership in the collection evolve according to whether as individuals, the players are profitable, break-even or unprofitable. Every turn of a play between players is characterized by all players using their prior state and the current data to make a decision to either buy, sell, or hold a fragment of knowledge that they gain from the data. Each player is characterized further by the graph of its developing knowledge at each play. MAPSOUL replaces the usual payoff computations by taking a combination of the graph spectra of their plays. In this way, a player is abstracted as a time evolution of its graph spectrum. These graph spectra are based on the decisions which are economic choices and therefore, can reach a fixed-point where the player has no incentive to change a decision position. The fixed point is a Nash Equilibrium.

In certain implementations, different hierarchical levels of agents can have qualitatively different types of optimization criteria. For example, at various levels the agents can seek to satisfy conditions of diversity, agreement with training data (e.g., the gold standard), providing a high amount of pointwise mutual information to higher-level agents, etc.

MAPSOUL machine learning leverages Nash equilibrium conditions, which are specified using a non-dimensional number concept, much like the way non-dimensional numbers are represented in empirically measured physical systems, such as the Froude or Reynolds numbers. Various non-dimensional numbers used in determining the relative merits of a choice to exchange information are described below with reference to FIG. 10. This is s non-limiting example of process 1130 is now provided, according to one implementation.

First, consider a data set, D, which is training data. Every player (as used herein the term "player" and "agent" are interchangeable) will be given a goal. For example, this goal may have been set by a user of the system as a machine-learning test set (i.e. gold-standard data) for the player to produce a reference set of vectors. That is, the goal for the player can be to operate on the data set D and thereby produce a vector of values from the data D, which as closely as possible matches the reference set of vectors (i.e., the gold standard or training data). In certain implementations, this vector valued representation of the data D produced by the player can be a complex valued vector. In certain implementations, a pattern vector (PV) can be calculated from this vector valued representation, which is referred to as a preference vector. As described for step 1220 of process 1130, the PV can be understood as representing percepts from the point of view of the agent relative to the positions of other agents.

Second, vector valued representation is categorized (possibly incorrectly categorized) into a cluster. Further, for each of the n known positive-examples of data of the given dataset D, each player may have one or more vectors of the same datum.

Third, the player will have a sensitivity threshold set whereby a vector on a datum is considered identical to another datum vector if their cosine measure does not differ by an amount less than or equal to the threshold value.

This process can be understood as analogous to co-occurrence vectors based on term-term matrices used in vector semantics (e.g., to calculate similarity as a cosine between the pointwise mutual information measure (PMI), treating different terms—analogous to metadata tags or connections between agents—as context), as described in available in D. Jurafsky and J. Martin, *Speech and Language Processing*, $3^{rd}$ Ed. (Draft), https://web.stanford.edu/~jurafsky/slp3/ed3book.pdf, which is incorporated herein by reference in its entirety (and especially in chapter 15 describing vector semantics). For example, in certain implementations, agent can reference particular positions of a data stream, which has been tagged with metadata, and the links between metadata tags can correspond to connections between respective agents. Thus, like a term-term matrix used in vector semantics to measure frequencies between word pairs within a given distance, the matrix representation of the vectors of agents can represent a frequency of meta-data tags occurring within a certain number of links of the agents (i.e., the connectedness of agents and their proximity).

Figure 10:
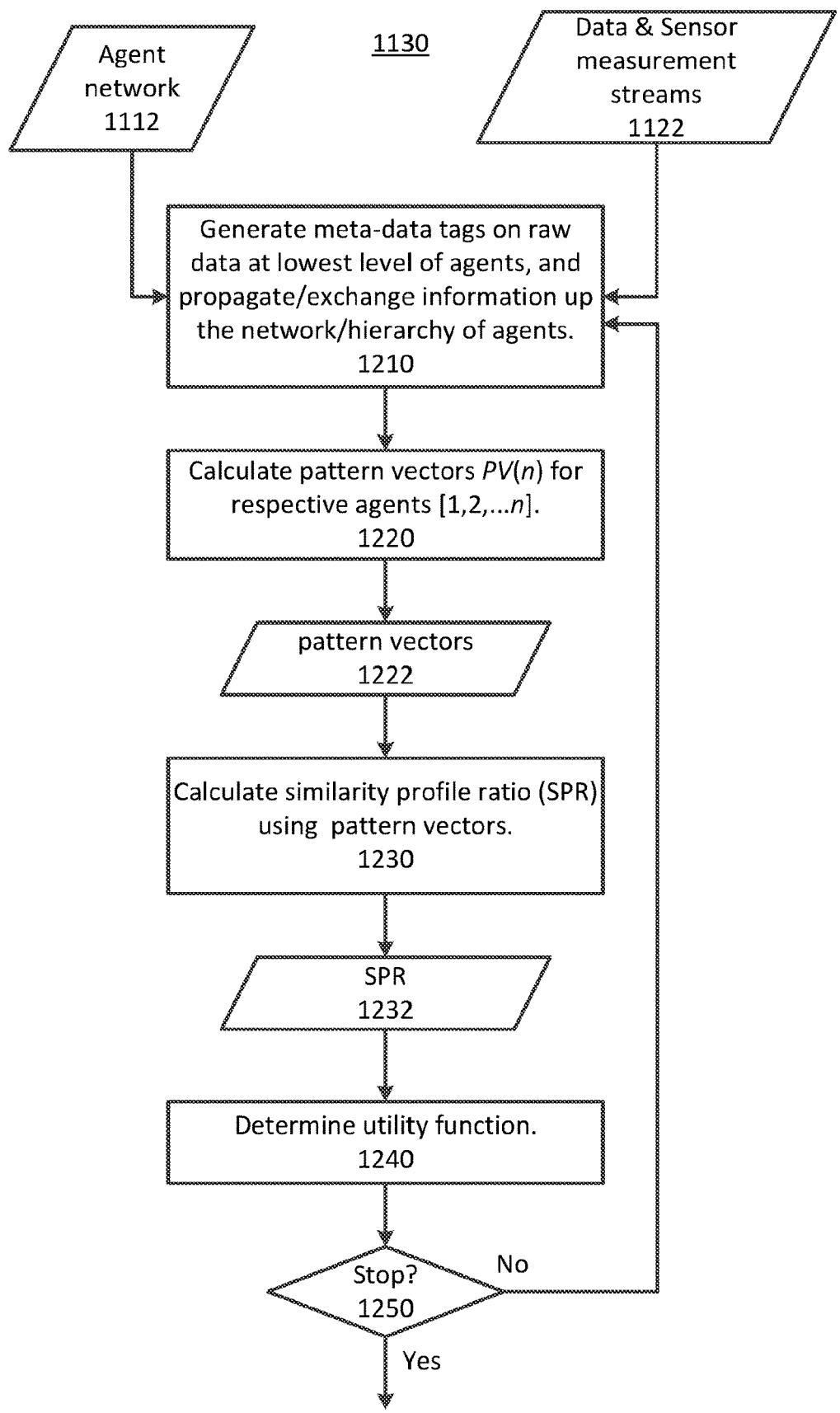
FIG. 10 shows an example of a flow diagram of a process of an agent generating and revising a hypothesis using preference, objective, and utility functions, according to on implementation.

Each of these calculations is described below in greater detail with reference to FIG. 10.

The learning process occurs because the links between agent can shift or be deleted or be added. In the case of a stable network (where things remain the same for a number of cycles) then that state is the learned state. In economic terms, the learned state has achieved a Nash equilibrium. Training data is used to learn the network in which no agent is incentivized (by the utility function) to change its connections with any other agent with respect to the data. This fixed point is usually set as a parameter in terms of the number of cycles of computations (e.g. of 3 iterations if nothing changes then consider that the learned state). When the system is first initialized agents are allocated randomly to the data.

Note that goals are themselves properties of the Utility function. Objective and Preference functions adjust what the agent values that tends to optimality as the agent (usually randomly) explore its data using these functions: the agent only does well if it reaches an equilibrium in the network (Nash).

Training data set the data and the meta-data, and the goal is usually a human provided expected intended result or interpretation: it is this that is learned by the network. The network is dynamic because agents can change their positions or relations with others until it is no longer optimal for the agent to change its position. At that point the Nash equilibrium has been achieved FIG. 10 shows a flow diagram of process 1130 to formulate and revise hypothesis from the provided data. As discussed above, the agents make choices based on their respective perceptions from the lower-level agents and based on chosen models and hypotheses that are learned according to the agents self-interest in terms of 1) A utility function;
2) An objective function; and,
3) A preference function.

In step 1210 of process 1130, the data is mapped into a domain independent form by applying metadata tags to the received data. That is, a preference function is assigned to an agent, and the preference function maps metadata to data. According to certain implementations, for any input data, a most general metadata type is assigned to each input data. There are 5 main classes of top-level metadata types defined for any player. These are (i) donor; (ii) acceptor; (iii) negators (iv) positors and (v) logical types (prepositional relators, implicators, as well as first-order logic "and" and "or" operators). These types can be complemented by any subtype structure the user may wish to add, such as linguistic case roles or themes or image descriptors in the case of visual input or audio descriptors in the case of audio inputs.

For example, in the case of natural language input, nouns identified in a sentence input can be tagged with the metadata type "donor". In the same input sentence, the identified verb can be tagged with the metadata type "acceptor". Adjectives/adverbs can be tagged as negators/positors by using these terms to mean their polarity from a sentiment or judgment point of view (according to a human). Logical types can be used to tag prepositions and other functional words. The result is a graph of the sentence labeled by the tags.

Example #1: "John went to Boston"
In this example we will label (with some external labeling oracle) the sentence using the metadata tags: $donor_{John}$ $acceptor_{went}$ $logical_{to}$ $donor_{Boston}$ In another example, in the case of image input and other types of data input, the concept of "donor" in an image scene can be the representative of the lighter reflective regions while "acceptors" can be representative of the darker non-reflective regions while their subcomponent parts (sub-image regions) can be represented combinations of the other types of tags. The result is a graph of the image labeled by the tags.

The domain dependent process, therefore, results in meta-data tagging using the restricted set of top metadata types (the set of 5 top types) and any subtypes which is represented as the graph or trees of the types are induced by the data.

In step 1220, the pattern vectors 1222 of the respective agents are calculated as follows:

1) The distance between two tagged parts (a pair) is defined as the minimum number of connecting links between the pair (intervening links built between their intervening tagged data). Let this number be called "n".

2) Create a frequency and link distance matrix by counting how often each pair of top-level metadata types are found each at a distance smaller than a given "n" (frequency, "f" versus link distance, "n") for a set of players exchanges (in time, t) as their preferences may change over time.
3) Interpret the matrix as a set of vectors called the preference frequency correlation vector (PFCV) as: n*f
4) Normalize the PFCV values by dividing each entry of the vector by the total number player exchanges within the timeframe: NPFCV=(n*f)/(exchanges)
5) Compute the global vector as the logical "or" of the preference vectors, NPFCV.
6) Finally, for the manager of the collection of players, compute the preference inverse frequency correlation vector: PIFCV=NPFCV/players.

Returning to Example #1: "John went to Boston"

donor$_{John}$ acceptor$_{went}$ logical$_{to}$ donor$_{Boston}$

The number of adjacencies between John and Boston (i.e., from donor to donor) is 3:

Here is the enumeration of the 3: [john,went], [went,to], [to,boston]

We call the number 3 the link-distance and therefore we count link distances at 2 and 1 respectively for the combinations of types instead of words. Hence, donor to donor has a link-distance of 3.

Here is a partial matrix representation of the vectors:

|  | (donor/ acceptor) | (donor/ logical) | (logical/acceptor) | (donor/donor) |
| --- | --- | --- | --- | --- |
| Distance = 1 | 1 | 1 | 1 | 0 |
| Distance = 2 | 1 | 1 | 0 | 0 |
| Distance = 3 | 0 | 0 | 0 | 1 |

This results in a pattern vector(sums of columns)=(2, 2,1,1) for the meta-data pattern=[(donor/acceptor),(donor/logical),(logical/acceptor),(donor/donor)

For each player we define the pattern-vector for inputs as:

$$PV(n) = \frac{1}{D}\sum_i^D \sum_j^D \delta_{ij,d}^T$$

The n-th player is given by "n" and D is the total number of data (in the case of the sentence, there are 4 words in "John went to Boston"). The i-th metadata and j-th metadata tag distance matrix is computed, their sums taken and divided by the total number of data, D.

For the example, PV(1)=¼*(2,2,1,1)=(0.5,0.5,0.25, 0.25).

For a number of different players, all under the same manager, we have:

PV(Manager)=PV(n)|PV(n−1)| . . . PV(1), wherein an "or" operation performed on decimal numbers returns a maximum value of the decimal numbers. Similarly, an "and" operation performed on decimal numbers returns a minimum value of the decimal numbers returns a minimum value of the decimal numbers.

Accordingly, the PV can be understood as representing percepts from the point of view of the agent relative to the positions of other agents. Since agents are nodes, it is simply a kind of fingerprint computed for each node in the network.

Each node will have slightly different values though some may have the same values (because their local neighborhood is that same as the local neighborhood of another agent). For example, the PV(n) is a path matrix that is stated from "point of view" of the n-th agent. Accordingly, in the example considered below the "point of view" (e.g., preferences) of the agent that references the first position (i.e., n−1) are characterized using a matrix representation of:

(donor/acceptor)(donor/logical)(logical/acceptor)(donor/donor)

Another agent corresponding to n=2 references the second position, which is an "acceptor". Hence, it would be characterized using a matrix representation:

(acceptor/logical)(logical/donor)(logical/acceptor) (acceptor/donor)

Accordingly, different agents reference different positions, have different points of view, and consequently produce different vector representations.

In step 1230, a similarity search is performed over the preference vectors and the result is used to calculate a Similarity Profile Ratio (SPR) 1232. The similarity search is illustrated using the non-limiting example of using a Multi-Vantage-Point (MVP) Tree, but any known method of performing a similarity search can be used.

Recall that the data set D was provided together with a reference vector and that vector valued representations (PV) are categorized into clusters (e.g., using a similarity search). Further, for each of the n known positive-examples of data of the given dataset D, each player may have one or more vectors of the same datum.

In certain implementations, the step of clustering is performed by storing the preference vectors in an MVP Tree. The objective function measures agreement between players and data. A similarity search is performed between player-to-player data using the MVP-Tree. Hence, there are n similarity searches (one for each player's datum) where each of the known positive examples in turn, is the query structure from the player to the MVP tree to return its nearest neighbours as a similarity score. The result is effectively a pair-wise similarity of the respective players. Each data used in the pair-wise similarity is marked off in the MVP tree.

Next, any unmarked remaining data is then used to compute an additional pair-wise similarity score against all the remaining marked data examples (n−1) and all negative-examples of the filtering database (no match similarity–since these are outside the threshold of the nearest neighbors search).

This procedure yields n similarity ranked lists that are fused into a final similarity ranked list that incorporates the rankings of the n individual lists.

The vectors are then used to compute an objective function called the Similarity Profile Ratio (SPR), over time, t. This objective function results in a profile of temporal evolution of non-dimensional numbers because they are computed by the ratios:

$$SPR(t) = t \cdot \left( \frac{\left(\frac{S_{Positive}}{S_{Total}}\right)}{\left(\frac{P_{Positive}}{P_{Total}}\right)} \bigg/ \left(\frac{Q}{R}\right) \right) - SPR(t-1),$$

wherein, at initial iteration time t=0, SPR(t−1)=0. The argument $P_{total}$ is the total number of both positive and negative examples recognized and categorized not recognized respectively by the player with respect to a goal (i.e. a target category). The value $P_{postive}$ is the number of positive examples correctly categorized by the player on the dataset. The value $S_{total}$ is the total number of input-data examples in the currently processing data_set. The value $S_{positive}$ is the number of positive examples found in the currently processing subset.

The value Q is the number of positive identifications of the algorithm in a random trial referenced to a human player that plays the role of a gold standard of truth. The value R is the total number of examples available in a random trial on the algorithm. Some algorithms will have a ratio where Q/R=1.0 (e.g., those that identify one category of data versus another category of data) and others will have a ratio less than this depending on semantic complexity (e.g., identify a pattern that correlates to two different data categories).

Any method that is superior to a random selection of answers to a query returns an SPR>1.0. This is, therefore, a measure of how well the system performs its categorizations versus random guesses (i.e., like a monkey and dartboard analogy).

The SPR 1232 has an upper limit. This upper limit is in proportion to the fraction of positive-examples in the dataset and player quality (equaling human performance). The limits are reached when the SPR 1232 reaches a fixed upper bound. The number of iterations, in time, required for the SPR 1232 to reach its upper bound is interpreted as the efficiency of the collection of players performing the categorization and agreeing on the categorization.

Comparing several different players is meaningful if they are carried out only with the same dataset, as it makes no sense to calibrate players against data that randomly vary.

In step 1240, the utility function is calculated. Utility functions are often defined in terms of distance metrics such as cost or travel time, for example. In the case of the Euclidean distance metric as a utility function, the assumption is that feature vector semantics represent objects homogeneously in the same way. For an evolving system with multiple types of metadata that may not easily map one to the other because of deep domain disparities, the utility function defined herein will be able to produce a useful measurement even when there are such incommensurate semantic representations (i.e., the metadata are not homogeneous representations). The utility function is a non-dimensional number, a heuristic measure that is based on intuitions about the nature of similarity and analogy. The first intuition is that similarity can be judged between a range from a minimum of zero (totally dissimilar) to 1 (totally similar).

$$S(\rho_i, \sigma_i) = \left(\frac{1}{e}\right) * e^{\sum_i^n (\rho_i * \sigma_i)} / e^{\sum_i^n ((1-\rho_i) * \sigma_i)}; \rho_i \leq \wedge \sigma_i \leq 1$$

In order to measure similarity, we choose two different players, A and B:
1) $\rho_i$ is the value of the i-th element of a PV for player-A using its semantic basis of metadata; and,
2) $\sigma_i$ is the value of the i-th element of a PV for player-B which is derived from its basis of metadata not necessarily the same as player-A.
3) n is the cardinality of the maximum link distance of the metadata (if one metadata has greater dimensions then the common lesser is used).

The second intuition is that correlated data, despite differences in metadata, could be evaluated if the value p is defined as the expectation of the presence of features in a (i.e., if both p and a are correlated data). This results in high scores, which we use to identify clusters with many features in regions of query data that have high probabilities to the neighboring correlated data from other players. However, as a third intuition, it is also important to penalize the presence of player-pairs in regions with very low probabilities. In this case, the denominator weights the presence of pairs with the inverted probabilities of the data in the cluster (i.e., a model of several data elements explaining a semantic feature of interest).

Therefore, we define that the SPR 1232 is used to choose the appropriate metadata tags that can be compared between players, else the probabilities will distribute randomly and the clustering will be "smeared" out in the regions (i.e., they will fail to reliably identify mutual correlated semantic categories). It is important to choose high diversities between players so that their maximum mutual potential for high fidelity data categorization is optimal. For example, the intuition that Marvin Minsky stated in his work on Society of Mind is the principle of diversity. MAPSOUL includes a diversity enforcer that randomly samples data and rejects players for learning on that data based on a user-defined threshold for diversity which in turn is itself based on the intuition that high diversity is an indicator of perception power. When calculating diversity, two binary-string representations are used, one as search query for a player (A) and one for the reference structure (gold standard) for comparison where the player is assumed to be the human user (B). The size and data of players is based on their metadata store, and their uncategorized data. For the matching operations, the following values are used:
1. a=Number of 1s in bit vector A
2. b=Number of 1s in bit vector B
3. c=Number of common 1s for A and B
4. d=All 1s in A or B which are not common (XOR)
5. n=The length of the bit-strings The Tanimoto coefficient (Tc) is the most commonly used coefficient to make any conclusion with regard to similarity using bit-string similarities.

$$T_C = \frac{c}{(a+b-c)}$$

Example #2: 4 common features,
A: (0 1 0 1 1 1 1 1 0 0 0)
B: (1 0 1 0 1 1 1 1 0 0 0)
Tc=½
The Tanimoto diversity measure follows:

$$Diversity_{TANIMOTO} = \frac{1-c}{(a+b-c)} \backslash$$

Using this measure, players encoding metadata with only a few or a limited number of features will trend towards high diversity when compared with larger players. The Hamming measure has the inverse trend line—larger players with many metadata features will trend towards high diversity.

$$Diversity_{HAMMING} = \frac{d}{n}$$

The measure we use is based on combining complementing strengths and weaknesses for both measures of diversity called the Dixon-Koehler modification:

$$Diversity_{DK} = D_{HAMMING} D_{TANIMOTO} = \frac{d*(1-c)}{n*(a+b-c)}$$

The size effects connected to the diversity measures cancel each other in the Dixon-Koehler diversity measure. We use these measures to convert player vectors in a serialized way into a (long) binary string and can be profiled over a period of time.

In view of the above, it can be appreciated that MAPSOUL offers a novel approach to rapidly achieve learning and classification of data in very high complexity and overcomes all traditional approaches to modeling and using the Nash Equilibrium for learning data. At a given time the learned relationships between the agents represent a graph with the agents at the vertices and the exchanges of information representing links/edges between the vertices. This graph can be captured and expressed as a surrogate ranking operator that can be used to rapidly rank the vertices in the graph, as described above for generating the SRO.

That is, MAPSOUL can be used as a system and method to learn and rank data within a network using a ranking operator. When applied to data, the ranking operator produces the rank related data. The machine learning aspect has the property of learning, mimicking, and producing weights faster than conventional approaches based on propagating computation or activation between nodes associated in a network (as used for machine learning or associative indexing). The ranking aspect is a scalable, high-speed, approximator of the structure and inter-relationships in networks, such as those that are derived from machine learning including artificial neural networks, deep learning, and reinforcement learning, to name a few. The present disclosure can be applied in information retrieval, the activity of obtaining resources relevant to an information need from a collection of information resources. Web search engines such as Google, Bing, and Yahoo are the most well-known applications of information retrieval. The disclosure can also be applied in an information filtering system, for example a recommender system or recommendation engine that recommends content to users. The disclosure can also be used in any machine learning or artificial intelligence system for data analytics in the medical, financial, and other fields.

The system includes a process parallel framework and a unique adaptation methodology that continuously optimizes objective functions of interacting software agents. The agents converge to a Nash Equilibrium representing the contribution of each agent's reasoning paradigm (e.g., belief network, decision tree, etc.) after a batch of data is processed. The network of agents represents the best matrix for then calculating the ranking operator. This patent enables efficiency in combining multiple reasoning paradigms into a flexible, fault-tolerant system. This patent also enables efficiency and optimization of computing resources necessary for convergence of artificial neural networks, ensemble of machine learning agents (processing modules or entities), or arbitrary networks. This patent enables a system to self-tune to weak signals in poor and noisy data while processing is ongoing.

This system also includes a unique methodology for calculating the relative ranking between vertices, or nodes, in a network, for example in cybersecurity, medical informatics, social, symbolic, semantic, and Web networks. The ranking operator computes the ranking of input, or state vectors, that order the nodes with respect to each other: where the nodes can be raw data but in the preferred embodiment are agents. In other words, the ranking operator maps one state vector, which is the state represented by positions of nodes in a graph, to another state vector, which is the state represented by ranks between nodes in a subgraph. This patent enables convergence to a unique dominant eigenvector without the need for a "fudge factor" to force irreducibility, as used by PageRank. This patent also enables accuracy of a higher order for distinguishing among elements of ranked vectors. Operators are a precise and accurate construct of the underlying relational network structure. This patent enables personalization for tasks such as information retrieval, recommendation engines, to name a few.

In summary, this patent addresses the problems of efficiently building a machine learning system that combines multiple reasoning paradigms into a flexible, fault-tolerant system, and efficiently storing the learned state for use and/or re-use. We call the system: Model and Pattern Structure Online Unital Learning, or MAPSOUL.

MAPSOUL builds on the surrogate ranking operator by using economics as an organizing principle for software agents such that these agents can function as players in a game of profit, loss or break-even. Each player has a subjective model of the environment that is a set of directional probability density distributions (real and complex) over their own consequences as a function of their own action and information. In MAPSOUL, the set of subjective player beliefs does not include the true, objective distribution (i.e., an assumption of ignorance). It can be appreciated that this is a distinguishing element. Specifically, all agents are by themselves assumed to be wrong until proven correct with respect to classifying and predicting the data. In other words, all players are always assuming maximal ignorance and, therefore, inference is treated false until the absence of evidence to the contrary permits revision or commitment to an inferred hypothesis.

MAPSOUL works by randomly selecting a subset of players (processing modules) from a catalog of players who are ready and waiting. By one embodiment, the random selection of players is performed by a Genetic Algorithm. Each player is assumed to have a partially or fully incorrect subjective model. The player model is based on a set of preferences over payoff-relevant objective functions with respect to a utility function. Each player follows a strategy of optimal self-interest in which beliefs about the data or environment is assumed optimal under the set of beliefs possible. Specifically, in terms of game theory, the players are not only playing with the data, but rather also play each other, whereby they form predictions about each other from their respective point of view. The emergence of Nash Equilibrium indicates that a specific context has been induced from the data. If all contexts are induced (i.e. the set of all Nash equilibria) then the players are learning machines that have learned the correct model and they can be re-used as a deduction machine.

In summary, MAPSOUL provides a highly adaptive and generic parallel processing control model in conjunction with a runtime system for execution in the cloud (i.e. distributed computations on networks). Further, in contrast to conventional methods, MAPSOUL provides the following advantages
 irregular general-purpose computational agents or actors or players resource (time, memory, and cpu-consumption) elasticity, interaction, synchronization, data-transfer, locality and scheduling abstraction, ability to handle large sets of irregularly distributed players ability to handle irregularly unstructured data, and fault-tolerance, self-tuning and adaptive recovery.

While certain implementations have been described, these implementations have been presented by way of example only, and are not intended to limit the scope of this disclosure. The novel devices, systems and methods described herein may be embodied in a variety of other forms; furthermore, various omissions, substitutions, and changes in the form of the devices, systems and methods described herein may be made without departing from the spirit of this disclosure. The accompanying claims and their equivalents are intended to cover.

The invention claimed is:

1. A website ranking apparatus, comprising:
a network communications interface connected to an internet including a plurality of websites, and configured to receive data elements from the websites;
a memory storing a database of the websites, the database of the websites including a plurality of nodes representing the respective websites and data elements received therefrom, and the plurality of nodes being respectively connected by a plurality of links representing connections between the websites; and
processing circuitry configured to
receive, via a user interface of the apparatus, an input query from a user, the input query including one or more keywords of a website search;
determine a first-order path matrix including values representing one-link paths between pairs of the plurality of nodes, which are connected by a respective one of the plurality of links;
generate a surrogate ranking operator (SRO) using a power series of the first-order path matrix;
rank the websites using a matrix product between a state vector of the input query, including the one or more keywords, and the generated SRO to determine a ranking of the websites; and
display, via the user interface, the ranked websites in order of the ranking of the websites, as a recommendation of best websites satisfying the received input query including the one or more keywords of the website search,
wherein the processing circuitry is further configured to generate the SRO by summing the power series such that, in the power series, each nth-order path matrix in the power series is divided by 2 raised to an nth power, when the plurality of links are ordered, and each nth-order path matrix in the power series is divided by a factorial of n, when the plurality of links are not ordered.

2. A recommender apparatus, comprising:
a memory storing a database of a network, wherein the network is a network of websites, the database of the network including a plurality of nodes, each representing a respective website and containing respective data elements, and the plurality of nodes being respectively connected by a plurality of links; and
processing circuitry configured to:
determine a first-order path matrix including values representing first-order adjacencies from the plurality of links that connect the plurality of nodes of the network database;
generate a surrogate ranking operator (SRO) using a power series of the first-order path matrix;
receive, via a user interface of the apparatus, one or more input data elements including one or more keywords of a website search, representing ranking criteria, and generate an input state vector of the input data elements including the one or more keywords;
rank the websites of the network using a matrix product of the generated SRO and the input state vector to determine a ranking of the websites, wherein the processing circuitry is further configured to rank the websites of the network using a personalized preference matrix together with the SRO to personalize the rankings according to personal preferences of the user; and
display, via the user interface, the ranked websites in order of the ranking of the websites, as recommendations of best websites corresponding to the one or more keywords of the website search,
wherein the processing circuitry is further configured to generate the SRO by summing the power series such that, in the power series, each nth-order path matrix in the power series is divided by 2 raised to an nth power, when the plurality of links are ordered, and each nth-order path matrix in the power series is divided by a factorial of n, when the plurality of links are not ordered.

3. The recommender apparatus of claim 2, wherein the processing circuitry is configured to generate the SRO by:
decomposing the first-order path matrix into eigenvalues and eigenvectors to generate a diagonal matrix of the eigenvalues, a unitary matrix having the eigenvectors as column vectors, and a Hermitian conjugate of the unitary matrix;
generating nth-order path matrices as an nth power of the first-order path matrix, by taking the nth power of the diagonal matrix of the eigenvalues and multiplying on the left by the unitary matrix and on the right by the Hermitian conjugate of the unitary matrix; and
summing the nth-order path matrices using a power series.

4. The recommender apparatus of claim 3, wherein the processing circuitry is further configured to generate the SRO by decomposing the first-order path matrix into the eigenvalues, wherein the eigenvalues represent a spectrum of the first-order path matrix.

5. The recommender apparatus of claim 2, wherein the processing circuitry is further configured to modify the first-order path matrix prior to generating the SRO by:
normalizing the first-order path matrix using a determinant of the first-order path matrix; and
ensuring that the first-order path matrix satisfies a bistochasticity condition,
wherein the SRO is generated using the modified first-order path matrix to calculate the power series of the first-order path matrix.

6. The recommender apparatus of claim 2, wherein the processing circuitry is further configured to determine the first-order path matrix by using a discrete approximation to diffusion operator, wherein a rate of diffusion is greater across links of the plurality of links that represent a greater connection between pairs of nodes corresponding to the respective links.

7. The recommender apparatus of claim 2, wherein the processing circuitry is further configured to determine the first-order path matrix using elements of the first-order path matrix that are real numbers when the plurality of links express are undirected, the elements of the first-order path matrix that are one of bivectors and complex numbers when the plurality of links are unidirectional, the elements of the first-order path matrix that are one of tessarines, bicomplex numbers, and split complex numbers when the plurality of links are bidirectional, and the elements of the first-order path matrix that are multivectors when the plurality of links are mixed.

8. The recommender apparatus of claim 2, wherein the processing circuitry is further configured to determine the first-order path matrix using elements of the first-order path matrix that are real numbers when the plurality of links express correlations between pairs of nodes of the network, the elements of the first-order path matrix that are one of bivectors and complex numbers when the plurality of links express associations between pairs of nodes of the network, the elements of the first-order path matrix that are one of tessarines, bicomplex numbers, and split complex numbers when the plurality of links express associations between pairs of nodes of the network, and the elements of the first-order path matrix that are multivectors when the plurality of links express attitudinal relationships between pairs of nodes of the network.

9. The recommender apparatus of claim 3, wherein the processing circuitry is further configured to generate the SRO by eliminating degeneracy in the eigenvalues before generating the diagonal matrix of the eigenvalues.

10. The recommender apparatus of claim 2, wherein the processing circuitry is further configured to generate the SRO, which is path adjusted by removing path redundancies in the nth-order path matrices prior to summing the nth-order path matrices using the power series.

11. The recommender apparatus of claim 2, wherein the processing circuitry is further configured to rank the nodes of the network using metadata to augment the SRO.

12. The recommender apparatus of claim 2, wherein the processing circuitry is further configured to receive the one or more input data elements, wherein upon the one or more input data elements including at least one data element that is absent from the data elements contained by plurality of nodes, and the at least one data element is mapped onto the input state vector using a measure that is one of a conceptual relativity measure, a semantic distance measure, a Jaccard measure, a mutual information measure, and a positive pointwise mutual information measure.

13. The recommender apparatus of claim 2, wherein the processing circuitry is further configured to determine the first-order path matrix, wherein the first-order path matrix is based on an operator of quantum graph theory that is one of a Hamiltonian operator, a Laplacian operator, and a Lagrangian operator.

14. A method of ranking a plurality of websites, the method comprising:

storing, in a non-transitory computer readable medium, a database of the websites, the database of the websites including a plurality of nodes representing the respective websites, and the plurality of nodes being respectively connected by a plurality of links representing connections between the websites;

determining, using processing circuitry, a first-order path matrix including values representing first-order adjacencies from the plurality of links that connect the plurality of nodes of the database of the websites;

generating, using the processing circuitry, a surrogate ranking operator (SRO) using a power series of the first-order path matrix;

receiving, via a user interface, one or more input data elements, including one or more keywords of a website search, representing ranking criteria, and generate an input state vector of the input data elements including the one or more keywords;

ranking, using the processing circuitry, the websites using a matrix product of the generated SRO and the input state vector to determine a ranking of the websites; and displaying, via the user interface, the ranked websites user in order of the ranking of the websites, as recommendations of best websites corresponding to the one or more keywords of the website search, wherein the generating step further comprises generating the SRO by summing the power series such that, in the power series, each nth-order path matrix in the power series is divided by 2 raised to an nth power, when the plurality of links are ordered, and each nth-order path matrix in the power series is divided by a factorial of n, when the plurality of links are not ordered.

15. The method of claim 14, wherein generating the SRO further includes:

decomposing the first-order path matrix into eigenvalues and eigenvectors to generate a diagonal matrix of the eigenvalues, a unitary matrix having the eigenvectors as column vectors, and a Hermitian conjugate of the unitary matrix;

generating nth-order path matrices as an nth power of the first-order path matrix, by taking the nth power of the diagonal matrix of the eigenvalues and multiplying on the left by the unitary matrix and on the right by the Hermitian conjugate of the unitary matrix; and summing the nth-order path matrices using a power series.

16. A non-transitory computer-readable medium storing executable instructions, wherein the instructions, when executed by processing circuitry, cause the processing circuitry to perform the method according to claim 14 of ranking the websites.

* * * * *